United States Patent
Park et al.

(10) Patent No.: US 10,855,560 B2
(45) Date of Patent: Dec. 1, 2020

(54) METHOD AND APPARATUS FOR MANAGING USER QUALITY OF EXPERIENCE (QOE) IN MOBILE COMMUNICATION SYSTEM

(71) Applicant: Samsung Electronics Co., Ltd., Suwon-si (KR)

(72) Inventors: Kibeom Park, Hwaseong-si (KR); Eunjin Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/587,602

(22) Filed: Sep. 30, 2019

(65) Prior Publication Data

US 2020/0044946 A1 Feb. 6, 2020

Related U.S. Application Data

(63) Continuation of application No. 15/554,590, filed as application No. PCT/KR2016/002250 on Mar. 7, 2016, now Pat. No. 10,439,902.

(30) Foreign Application Priority Data

Mar. 6, 2015 (KR) .................. 10-2015-0031793

(51) Int. Cl.
*G06F 13/00* (2006.01)
*H04L 12/24* (2006.01)
*H04L 12/26* (2006.01)

(52) U.S. Cl.
CPC .......... *H04L 41/5067* (2013.01); *H04L 41/00* (2013.01); *H04L 43/00* (2013.01); *H04L 43/50* (2013.01); *H04L 43/06* (2013.01)

(58) Field of Classification Search
CPC ..... H04L 43/50; H04L 41/5067; H04L 41/00; H04L 43/00; H04L 43/06
(Continued)

(56) References Cited

U.S. PATENT DOCUMENTS 9,270,527 B2 2/2016 King et al.
9,432,474 B2 8/2016 Li
(Continued)

FOREIGN PATENT DOCUMENTS

EP 2 670 084 A1 12/2013
KR 10-2012-0042114 A 5/2012
(Continued)

OTHER PUBLICATIONS

European Search Report dated Jan. 26, 2018, issued in a counterpart European application No. 16761955.0-1216 / 3267624.
(Continued)

*Primary Examiner* — Kenneth R Coulter
(74) *Attorney, Agent, or Firm* — Jefferson IP Law, LLP

(57) ABSTRACT

The present invention relates to a method and apparatus for managing quality in a mobile communication system and, more particularly, to a method and apparatus for managing user quality of experience (QoE) between various wired and wireless networks. A method for managing user quality of experience by means of an apparatus for managing user quality of experience in a mobile communication system, according to one embodiment of the present invention, comprises the steps of: setting a quality measurement request message by using a quality measurement condition received from a user; transmitting the quality measurement request message to a quality measurement device; and receiving information on the quality which is measured by using the quality measurement condition, wherein the quality measurement request message and the information on the
(Continued)

quality are transmitted while being included in an OpenFlow message.

14 Claims, 24 Drawing Sheets

(58) Field of Classification Search
USPC .......... 709/224, 223, 238, 249, 227–229
See application file for complete search history.

(56) References Cited

U.S. PATENT DOCUMENTS

| | | | |
|---|---|---|---|
| 9,497,094 B2 | 11/2016 | Manghirmalani et al. | |
| 9,680,762 B2* | 6/2017 | Li | H04L 49/30 |
| 10,439,902 B2* | 10/2019 | Park | H04L 41/5067 |
| 10,523,534 B2* | 12/2019 | Park | H04L 41/5067 |
| 2010/0315958 A1 | 12/2010 | Luo et al. | |
| 2013/0054792 A1* | 2/2013 | Sharaf | G06F 8/20 |
| | | | 709/224 |
| 2014/0086073 A1 | 3/2014 | Baykal et al. | |
| 2014/0189074 A1 | 7/2014 | Parker | |
| 2014/0201330 A1 | 7/2014 | Lozano Lopez et al. | |
| 2014/0307556 A1 | 10/2014 | Zhang | |
| 2014/0337507 A1 | 11/2014 | Manghirmalani et al. | |
| 2015/0039734 A1 | 2/2015 | King et al. | |
| 2015/0063144 A1 | 3/2015 | Kozat | |
| 2015/0244824 A1 | 8/2015 | Li | |
| 2016/0197839 A1* | 7/2016 | Li | H04L 47/6295 |
| | | | 370/392 |
| 2016/0226742 A1* | 8/2016 | Apathotharanan | H04L 43/12 |

FOREIGN PATENT DOCUMENTS

| | | |
|---|---|---|
| KR | 10-2012-0093548 A | 8/2012 |
| KR | 10-2015-0014739 A | 2/2015 |
| WO | 2012/058781 A1 | 5/2012 |
| WO | 2012/136633 A1 | 10/2012 |

OTHER PUBLICATIONS

Extended European Search Report dated Jan. 8, 2020, issued in European Application No. 19186561.7.

* cited by examiner

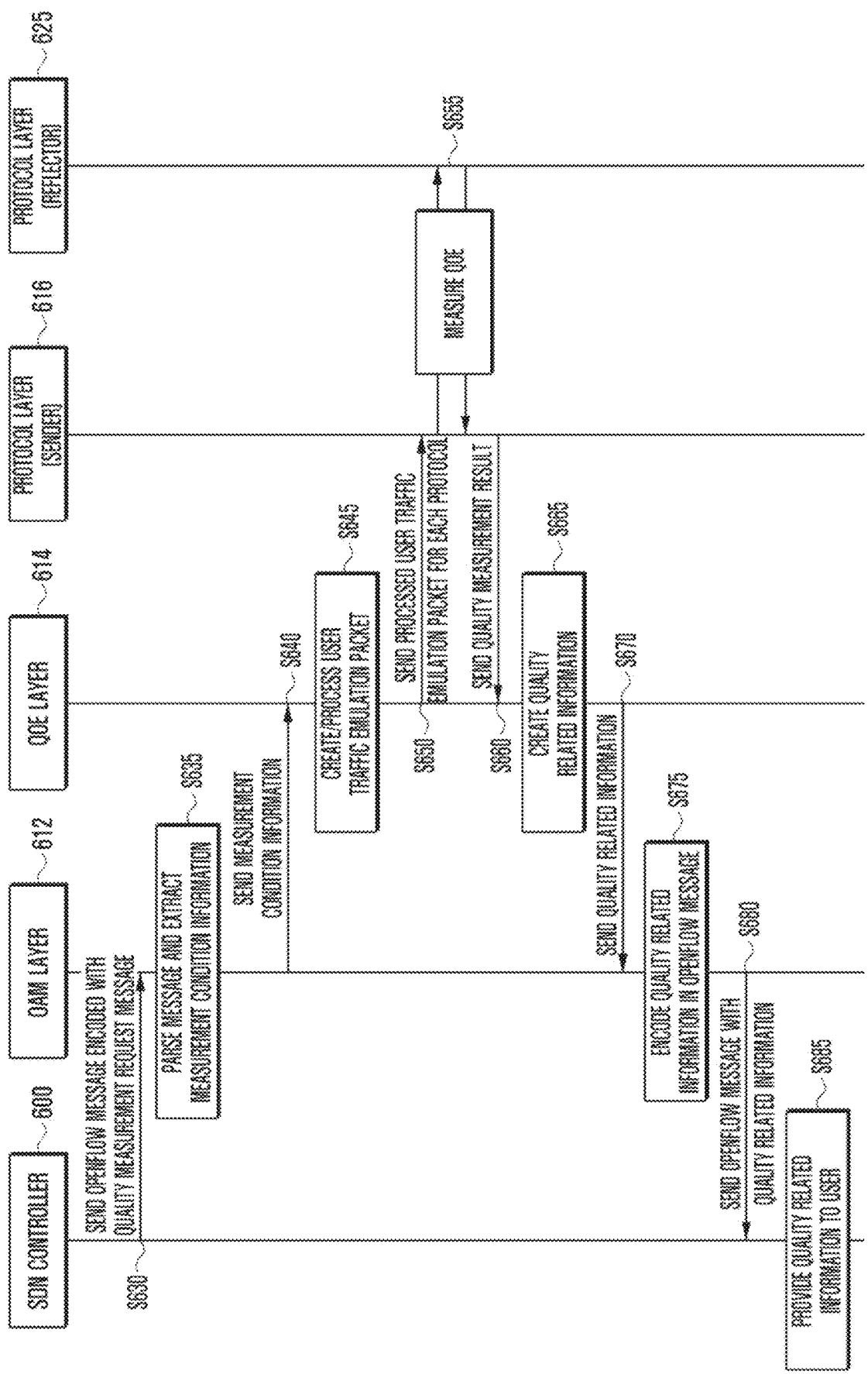

FIG. 6C

| | | |
|---|---|---|
| Src IP Address | 10.251.149.185 | |
| Dest IP Address | 10.251.149.185 | |
| Src Test Port | ☐ ~ ☐ | |
| Dest Control Port | ☐ | |
| Dest Port | ☐ | |
| DSCP-UDP | 0(BE) ▽ | |
| DSCP-TCP | 0(BE) ▽ | |
| User Application | None ▽ | |
| Packet Size | 512 | (83-8206 bytes) |
| ⦿ Count | 100 | (1-1000000) |
| ○ Duration | 10 | sec (10-3600) |
| ⦿ Scheduling | 0.1 | (0.1-10sec) |
| ○ BandWidth | bps ▽ | (~1Mbps) |
| ○ Packet/sec | 512 | (1-1024) |
| | packet/sec | |
| Timeout | 1 | (1-5sec) |

CHANNEL QUALITY MEASUREMENT CONDITION SETTING

Monitoring Info
OUI: 001632
SerialNum: 001632000507
Start Time: 2014-07-17 16:37:00
Update Time: 2014-07-17 07:37:27
Status: Running...

Metric
○ BandWidth
○ PPS
○ BPS
○ Loss
⦿ Delay
○ Jitter
○ MOS
○ Duplicated
○ Reorder
○ Availability
○ Connectivity

CHANNEL QUALITY MEASUREMENT RESULT

FIG. 9

| SERVICE TYPE | DETAILED TYPE | CODEC INFORMATION | UDP DSCP | Packet Size (byte) | PPS | Bandwidth (Kbps) |
|---|---|---|---|---|---|---|
| Voice | VoLTE | AMR-WB 23.85 | 46 | 115 | 50 | ~ N/A |
| | | AMR-WB 15.85 | 46 | 95 | 50 | ~ N/A |
| | | AMR-WB 12.65 | 46 | 87 | 50 | ~ N/A |
| | Wideband audio | AMR-WB 12.65 | 46 | 87 | 50 | ~ N/A |
| | VoIP | AMR 12.20 | 46 | 85 | 50 | ~ N/A |
| | | G.711 (64 kbps) | 46 | 214 | 50 | ~ N/A |
| Video | RTP video | H.264 1080P,30fps | 26 | 1500 | ~ N/A | 4500 |
| | | H.264 720P,30fps | 26 | 1500 | ~ N/A | 2500 |
| | | H.264 360P,30fps | 26 | 1500 | ~ N/A | 750 |

| Type | Description |
| --- | --- |
| 0x30 | Samsung OF Family ID |

1394

| Sub Type | Description |
| --- | --- |
| 0x0100 | OFSEC_CPU_RATIO (CPU ratio check) |
| 0x0101 | OFSEC_TWAMP_REQ (TWAMP Request) |
| 0x0102 | OFSEC_TWAMP_REPLY (TWAMP Reply) |

1395

| Flags | Flags Type | Description |
| --- | --- | --- |
| 1 << 0 | Request | OFSEC_REQ_STOP (Stop command) |
| 1 << 1 | | OFSEC_REQ_START (Start command) |
| 1 << 2 | Reply | OFSEC_REPLY_ACK (ACK message) |
| 1 << 3 | | OFSEC_REPLY_ERROR (Error message) |
| 1 << 4 | | OFSEC_REPLY_PERIOD (Period message) |
| 1 << 5 | | OFSEC_REPLY_SUMMARY (Summary message) |

1396

| o | Description |
| --- | --- |
| 0 | Operation Stop |
| 1 | Operation Start |

1397

| p | Description |
| --- | --- |
| 0 | Periodic Flag Off |
| 1 | Periodic Flag On |

1398

| v | Description |
| --- | --- |
| 0 | IP Version 6 |
| 1 | IP Version 4 |

| Type | Description |
|---|---|
| 0x30 | Samsung OF Family ID |

1415

| Sub Type | Description |
|---|---|
| 0x0100 | OFSEC_CPU_RATIO (CPU ratio check) |
| 0x0101 | OFSEC_TWAMP_REQ (TWAMP Request) |
| 0x0102 | OFSEC_TWAMP_REPLY (TWAMP Reply) |

1425

| Flags | Flags Type | Description |
|---|---|---|
| 1 << 0 | Request | OFSEC_REQ_STOP (Stop command) |
| 1 << 1 | | OFSEC_REQ_START (START command) |
| 1 << 2 | Reply | OFSEC_REPLY_ACK (ACK message) |
| 1 << 3 | | OFSEC_REPLY_ERROR (Error message) |
| 1 << 4 | | OFSEC_REPLY_PERIOD (Period message) |
| 1 << 5 | | OFSEC_REPLY_SUMMARY (Summary message) |

1435

| 0 | Description |
|---|---|
| 0 | Operation Stop |
| 1 | Operation Start |

FIG. 15B

| 1505 | Type | Description |
|---|---|---|
| | 0x30 | Samsung OF Family ID |

| 1515 | Sub Type | Description |
|---|---|---|
| | 0x0100 | OFSEC_CPU_RATIO (CPU ratio check) |
| | 0x0101 | OFSEC_TWAMP_REQ (TWAMP Request) |
| | 0x0102 | OFSEC_TWAMP_REPLY (TWAMP Reply) |

| 1525 | Flags | Flags Type | Description |
|---|---|---|---|
| | 1<<0 | Request | OFSEC_REQ_STOP (Stop command) |
| | 1<<1 | | OFSEC_REQ_START (START command) |
| | 1<<2 | Reply | OFSEC_REPLY_ACK (ACK message) |
| | 1<<3 | | OFSEC_REPLY_ERROR (Error message) |
| | 1<<4 | | OFSEC_REPLY_PERIOD (Period message) |
| | 1<<5 | | OFSEC_REPLY_SUMMARY (Summary message) |

FIG. 15C

| Message Type | Description |
|---|---|
| -1 | Error Message<br>Format: Date; Time; Severity; Description<br>Severity: Syslog level<br>- ErrFATAL = 3,   // THREAD TERMINATED.<br>- ErrWARNING = 4,<br>- ErrINFO = 6,<br>- ErrDEBUG = 7,<br>- ErrOK = 8<br>Example:<br>130101;101030;Invalid test duration : 400 (range = 0 ~ 300.0) |
| 0 | OF Samsung Request Message (OFPMP_TWAMP_TEST)<br>ACK Operation (Start/ Stop) |
| 100 | Summary Analysis csv format RESULT |
| 101 | Summary Analysis txt format RESULT |
| 102 | Summary Analysis csv format RESULT (High-Speed Mode) |
| 103 | Summary Analysis txt format RESULT (High-Speed Mode) |
| 104~199 | Other protocol txt/csv Summary Analysis RESULT reserved |
| 200 | Periodic Summary Analysis csv format RESULT |
| 201 | Periodic Summary Analysis txt format RESULT |
| 202 | Periodic Summary Analysis csv format RESULT (High-Speed Mode) |
| 203 | Periodic Summary Analysis txt format RESULT (High-Speed Mode) |
| 204~299 | Other protocol txt/csv Summary Analysis RESULT reserved |

1545

METHOD AND APPARATUS FOR MANAGING USER QUALITY OF EXPERIENCE (QOE) IN MOBILE COMMUNICATION SYSTEM

CROSS-REFERENCE TO RELATED APPLICATION(S)

This application is a continuation application of prior application Ser. No. 15/554,590, filed on Aug. 30, 2017, which has issued as U.S. Pat. No. 10,439,902 on Oct. 19, 2019, which is a U.S. National Stage application under 35 U.S.C. § 371 of an International application number PCT/KR2016/002250, filed on Mar. 7, 2016, and was based on and claimed priority under 35 U.S.C § 119(a) of a Korean patent application number 10-2015-0031793, filed on Mar. 6, 2015, in the Korean Intellectual Property Office, the disclosure of which is incorporated by reference herein in its entirety.

TECHNICAL FIELD

The present invention relates to a method and apparatus for managing quality in a mobile communication system and, more particularly, to a method and apparatus for managing the quality of experience (QoE) between various wired/wireless networks.

BACKGROUND ART

Recently, a variety of wired/wireless networks have evolved into complex networks having various technical specifications. With the advent of technologies such as internet of thing (IoT) as well as a small cell network, the number of networks to be managed is explosively increasing. In addition, convergence of network equipment with the existing cloud-based servers is rapidly proceeding.

In order to manage the quality of such complicated and many networks, there is an increasing need for technology of managing and guaranteeing the quality of experience (QoE) so as to ensure the level of quality that the user can experience, rather than to simply measure the quality on a network level. Also, many services based on this technology are emerging.

For this, communication service providers are required to install and operate many additional apparatuses for measuring and managing the quality of the network. A conventional measurement method using an external quality measurement apparatus requires new equipment for measuring the network quality, resulting in a significant cost burden and the difficulty of integrated network management.

DISCLOSURE

Technical Problem

In order to solve the above problems, the present invention provides a system and apparatus for measuring QoE of all network equipment by utilizing various standard measurement protocols in a network based on software defined networking (SDN). Further, the present invention provides a method for supporting measurement protocols of various standard specifications and measuring and managing QoE of various networks on various platforms including SDN.

Technical Solution

In order to achieve the above-described object, a method for managing a quality of experience (QoE) at a QoE management apparatus in a mobile communication system according to an embodiment of the present invention comprises steps of setting a quality measurement request message by using a quality measurement condition received from a user; transmitting the quality measurement request message to a quality measurement apparatus; and receiving quality related information measured by using the quality measurement condition, wherein the quality measurement request message and the quality related information are transmitted as being included in an OpenFlow message.

Additionally, in order to solve the above problems, a method for measuring a quality of experience (QoE) at a QoE measurement apparatus in a mobile communication system according to another embodiment of the present invention comprises steps of receiving, from a QoE management apparatus, a quality measurement request message created by using a quality measurement condition received from a user; creating quality related information by measuring a quality with other network node, based on the received quality measurement condition; and transmitting the quality related information to the QoE management apparatus, wherein the quality measurement request message and the quality related information are transmitted as being included in an OpenFlow message.

Additionally, in order to solve the above problems, an apparatus for managing a quality of experience (QoE) in a mobile communication system according to still another embodiment of the present invention comprises an interface configured to transmit and receive a message to and from other apparatus; and a controller configured to set a quality measurement request message by using a quality measurement condition received from a user, to transmit the quality measurement request message to a quality measurement apparatus, and to receive quality related information measured by using the quality measurement condition, wherein the quality measurement request message and the quality related information are transmitted as being included in an OpenFlow message.

Additionally, in order to solve the above problems, an apparatus for measuring a quality of experience (QoE) in a mobile communication system according to yet another embodiment of the present invention comprises an interface configured to transmit and receive a message to and from other apparatus; and a controller configured to receive, from a QoE management apparatus, a quality measurement request message created by using a quality measurement condition received from a user, to create quality related information by measuring a quality with other network node, based on the received quality measurement condition, and to transmit the quality related information to the QoE management apparatus, wherein the quality measurement request message and the quality related information are transmitted as being included in an OpenFlow message.

Advantageous Effects

According to embodiments of the present invention, the method and apparatus for managing QoE in the mobile communication system may manage QoE without an additional interface for managing network quality measurement conditions and measurement results in an existing SDN structure controlled based on OpenFlow. In addition, QoE management based technology which is not dependent on an upper control system and a lower protocol is provided, thus causing the effect of widening applicable areas.

DESCRIPTION OF DRAWINGS

FIGS. 6A, 6B, 6C, and 6D are diagrams illustrating a quality management system according to various embodiments of the present invention.

FIG. 9 is a diagram illustrating a table used for creating a user traffic emulation packet according to an embodiment of the present invention.

FIGS. 13A and 13B are diagrams illustrating an OpenFlow message according to various embodiments of the present invention.

FIGS. 14A and 14B are diagrams illustrating an OpenFlow message according to various embodiments of the present invention.

FIGS. 15A, 15B, and 15C are diagrams illustrating an OpenFlow message according to various embodiments of the present invention.

MODE FOR INVENTION

Figure 1:
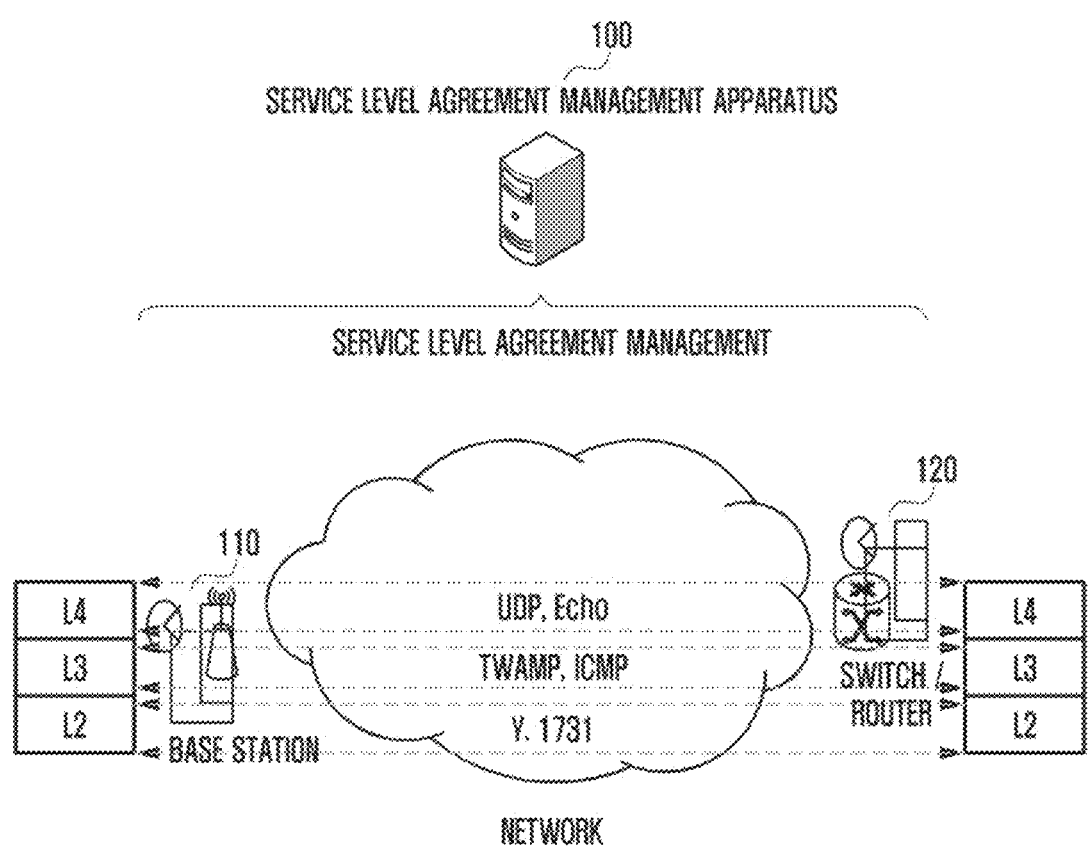
FIG. 1 is a diagram illustrating a method for measuring a method for measuring the quality of a network.

Hereinafter, embodiments of the present invention will be described in detail with reference to the accompanying drawings.

In describing the embodiments, descriptions of techniques which are well known in the art to which the present invention belongs and which are not directly related to the present invention will not be described or illustrated in detail. This is to avoid obscuring the subject matter of the present invention.

For the same reason, some elements are exaggerated, omitted or schematically shown in the accompanying drawings. Also, the size of each element does not entirely reflect the actual size. In the drawings, the same or corresponding elements are denoted by the same reference numerals.

The advantages and features of the present invention and the manner of achieving them will become apparent with reference to the embodiments described in detail below with reference to the accompanying drawings. The present invention may, however, be embodied in many different forms and should not be construed as limited to the embodiments set forth herein. Rather, these embodiments are provided so that this disclosure will be thorough and complete, and will fully convey the scope of the invention to those skilled in the art. To fully disclose the scope of the invention to those skilled in the art, and the invention is only defined by the scope of the claims.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, may refer to a software or hardware component or device, such as a field programmable gate array (FPGA) or application specific integrated circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and modules. In addition, the components and units may be implemented to operate one or more central processing units (CPUs) in a device or a secure multimedia card.

FIG. 1 is a diagram illustrating a method for measuring a method for measuring the quality of a network.

Specifically, in case of measuring the quality of a network in FIG. 1, it is possible to measure the quality with regard to one or more protocols (UDP, Echo, TWAMP, ICMP, Y.1731)

between a base station 110 and a switch or router 120 under the control of a service level agreement management apparatus 100.

There are many ways of measuring the quality of a network, but techniques to measure the quality of a network are generally classified into active monitoring and passive monitoring. The active monitoring is a method of creating a probe packet to measure quality, transmitting the probe packet to the network, storing necessary parameters in the probe packet, and then analyzing the probe packet. The passive monitoring is a method of measuring quality by observing packets actually passing through the network.

A scheme used in the active monitoring technique is, for example, to use a ping command using an internet control message protocol (ICMP) message or a user datagram protocol (UDP) echo packet for transmitting and receiving a probe packet. In addition, well-known programs such as iPerf are also a representative type of the active monitoring.

For a more accurate measurement control and for the creation of various measurement metrics, a data link layer uses Y.1731 performance monitoring (PM) that is a standard specification of the international telecommunication union telecommunication standardization sector (ITU-T), and an internet protocol (IP) layer uses two-way active measurement protocol (TWAMP) that is a standard specification of the internet engineering task force (IETF). Especially, the TWAMP is rapidly spreading to mobile communication equipment as well as the existing switch or router equipment, and various services using this are being introduced.

Figure 2:
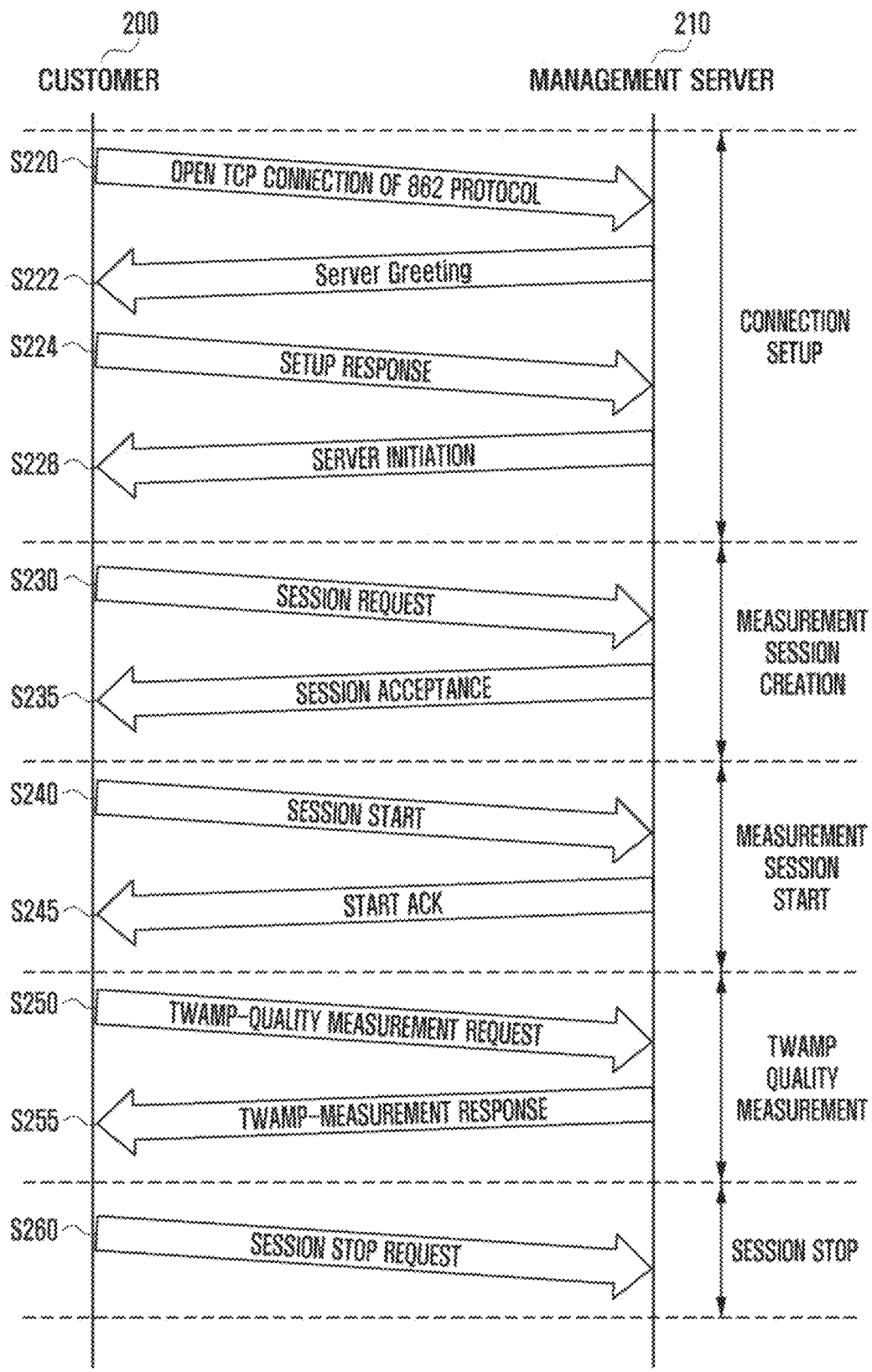
FIG. 2 is a diagram illustrating an operation scheme of a network protocol.

FIG. 2 is a diagram illustrating an operation scheme of a network protocol.

The TWAMP is characterized by transmitting a probe packet displaying necessary information from a sender to a receiver in a procedure, as shown, through a transmission control protocol (TCP) connection for operation control of session and negotiation of test conditions between both ends and through a user datagram protocol (UDP) for transmission of the probe packet.

At step S220, a customer 200 transmits a message requesting an open TCP connection of the 862 protocol to a management server. At step S222, the management server 210 transmits a "server greeting" message to the customer 200. At step S224, the customer 200 transmits a setup response message to the management server 210. At step S228, the management server 210 is initiated based on the received setup response message.

At step S230, the customer 200 may send a session request to the management server 210. At step S235, the management server 210 transmits a message of accepting the session in response to the session request. At step S240, the customer 200 transmits a message of starting the session to the management server 210. At step S245, the management server 210 transmits an acknowledgment (ACK) message about the reception of the session start message. At step S250, the customer 200 transmits a quality measurement request message in case of the TWAMP protocol. At step S255, the management server 210 transmits a TWAMP measurement response message in response to the quality measurement request message. At step S260, the customer 200 transmits a session stop request to the management server 210.

Currently, IP-based switches, routers, and various wired/wireless devices have many functions capable of responding to the TWAMP, which is becoming a representative scheme for IP performance monitoring (PM).

In addition to the TWAMP, other measurement schemes using standard protocols are defined. The Y.1731 PM, which is a standard measurement protocol based on Ethernet, is a specification created by ITU-T and also is a communication quality measurement specification adopted in the metro Ethernet forum (MEP).

Basically, the Y.1731 PM transmits a probe packet based on Ethernet frame, which is a layer2 packet type, and analyzes network quality results using the probe packet. Since the Y.1731 PM supports an Ethernet-based measurement scheme on the lowest layer, this allows measurement regardless of protocol on a higher layer. If a measurement target section has a certain section using only layer 2 information including Ethernet, any measurement scheme that operates on a higher layer may not be used and only a measurement scheme using the Y.1731 PM may be used.

Figure 3:
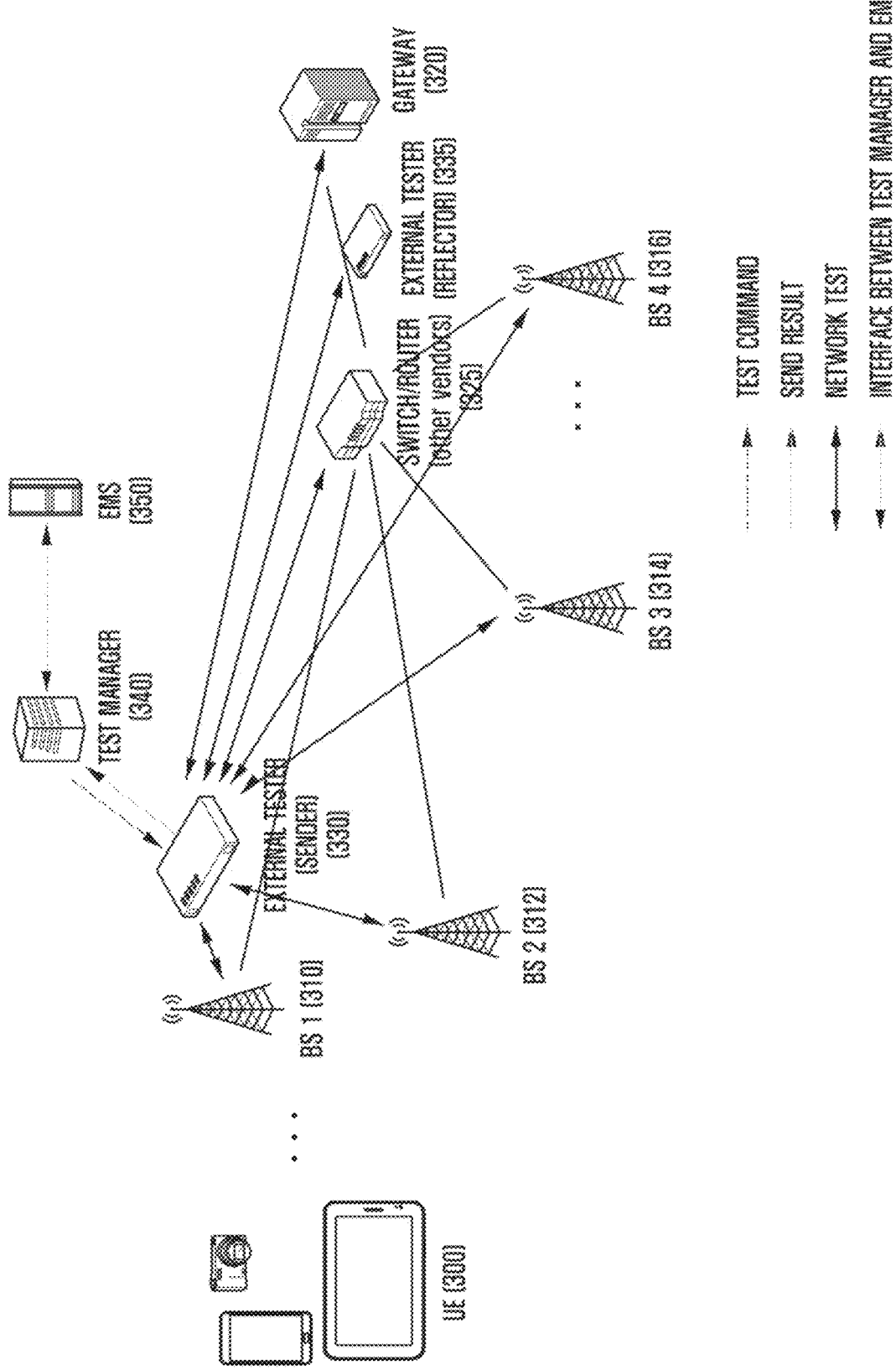
FIG. 3 is a diagram illustrating a network quality measurement scheme in a normal mobile communication system.

FIG. 3 is a diagram illustrating a network quality measurement scheme in a normal mobile communication system.

Referring to FIG. 3, a wireless mobile communication system may include in general a user equipment (UE) 300, a base station (e.g., a base transceiver station (BTS), a NodeB, an evolved node B (eNB), etc.) 310, 312, 314 and 316, a gateway (e.g., a base station controller (BSC), a radio network controller (RNC), an evolved packet core (EPC)) 320, a switch or router 325 installed in a section connected to a backhaul or core network between the base station and the gateway, and an element management system (EMS) 350. Specifically, the EMS is formed to manage network elements of the network, and essential operations are defined as fault, configuration, accounting, performance and security (FCAPS).

In order to measure quality through the active monitoring technique in the general wireless communication system as shown in FIG. 3, additional equipment is required such as an external tester (i.e., a sender) 330 for applying an active monitoring packet, an external tester (i.e., a reflector) 335 for responding to the packet, and a test manager 340 for managing measurement results.

The test manager 340 which performs a measurement control and a result management initiates identifying a network through the sender 330 and performs a quality measurement with various network elements (NEs) corresponding to the reflector 335. The network element that allows the measurement through the sender 330 is the reflector 335 or any existing network element capable of responding to a probe packet. After the measurement, the sender 330 transmits a measurement result to the test manager 340. The test manager 340 delivers the measurement result through an interface with the EMS 350.

Figure 4:
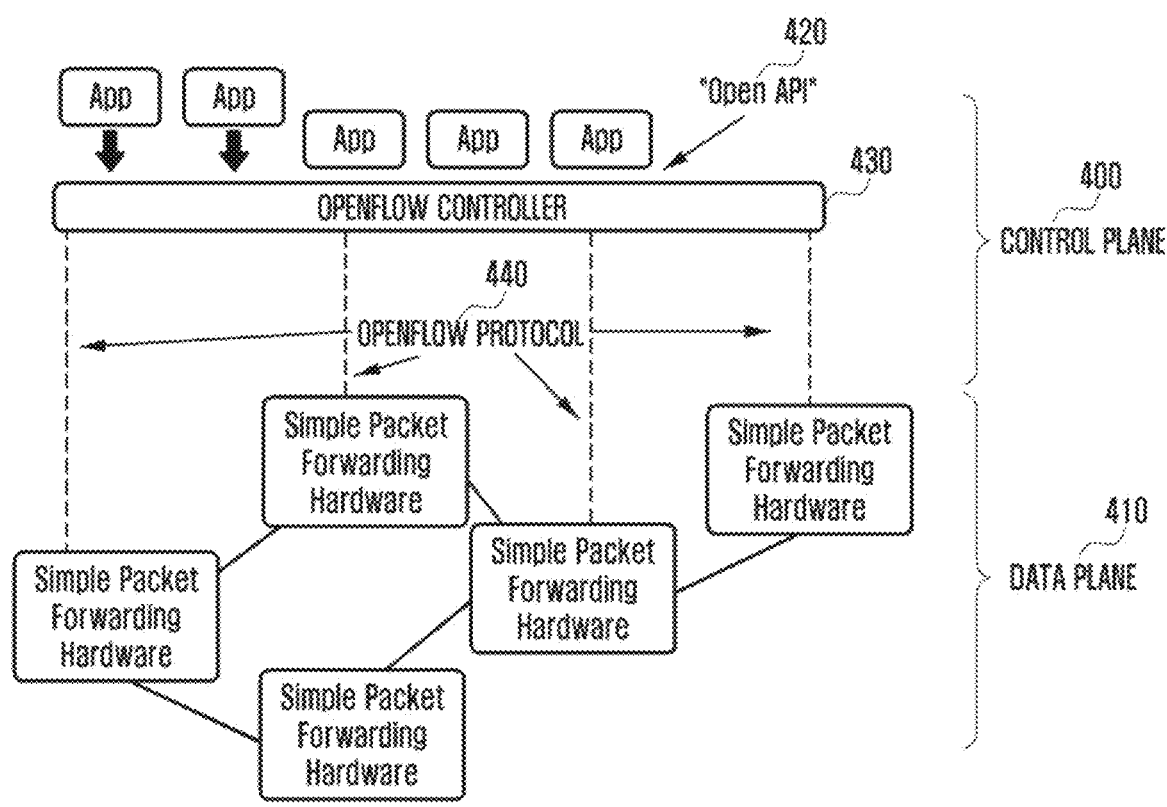
FIG. 4 is a diagram illustrating the structure of software defined networking (SDN) and the function of OpenFlow protocol.

FIG. 4 is a diagram illustrating the structure of software defined networking (SDN) and the function of OpenFlow protocol.

In the SDN structure, a centralized controller 430 has an open application programming interface (API) 420 supported by SDN and is formed of a structure for controlling an SDN switch that performs simple packet processing. In the SDN structure, the OpenFlow protocol 440 is generally and widely used as a standard protocol for performing a control between the centralized controller and the switch.

The OpenFlow protocol is used to deliver a message for standard operations for processing in a data plane 410 including a path control for each packet flow by a standard protocol between the SDN controller and the switch. The types of messages defined in the OpenFlow protocol may be classified into the following three types.

"Controller-to-switch" message: This is a message transmitted from the controller to the switch and used by the controller to manage the state of the switch. Typically, messages such as 'Feature', 'Configuration', 'Modify-States', and 'Send-Packet' are used.

"Asynchronous" message: This is a message transmitted from the switch to the controller and used to notify a network event and state change of the switch to the controller. Typically, messages such as 'Packet_IN' and 'Flow-Removed' are used.

"Symmetric" message: This message may be initiated from any of the switch and the controller, such as "Hello", "Echo Request", and "Echo Reply".

Figure 5:
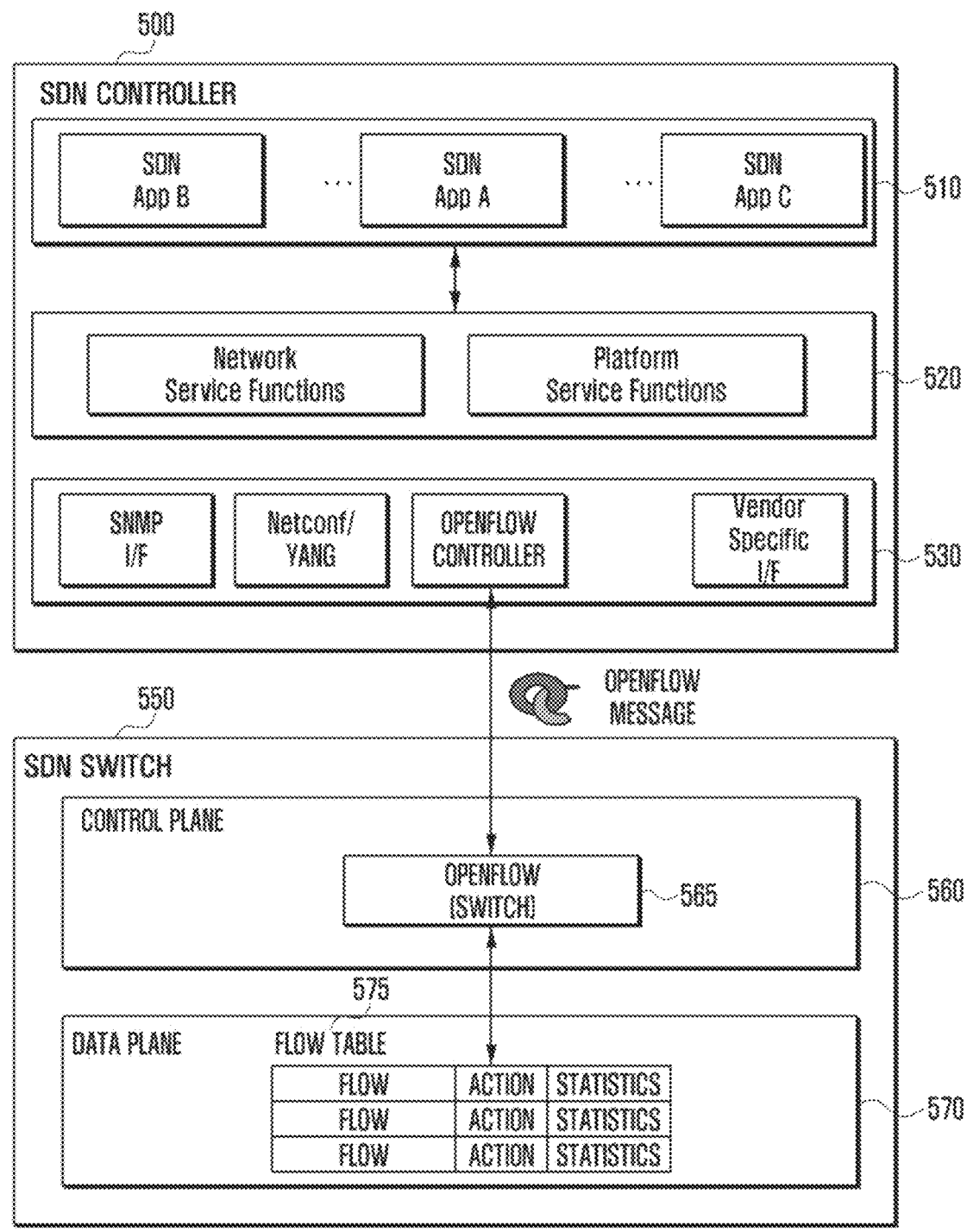
FIG. 5 is a block diagram illustrating configurations of an SDN controller and a switch in the SDN structure.

FIG. 5 is a block diagram illustrating configurations of an SDN controller and a switch in the SDN structure.

Specifically, the SDN illustrated in FIG. 5 is a structure having an interface that allows an application to be programmed according to a usage type scenario based on an Open API in order to control several switches basically controlled by the controller.

A control command of an SDN application 510 that operates above an OpenFlow controller 535 is delivered to an SDN switch 550 through a standard OpenFlow message. The SDN switch 550 sets related information in a flow table 575 therein through this message.

The most important function of the OpenFlow protocol is to control the flow table 575 responsible for packet processing on a data plane 570 in the SDN switch 550. Namely, the main function of the OpenFlow protocol in the existing SDN structure is to control the flow table 575 for packet processing and to transmit and receive related information to and from a controller 500.

However, a measurement scheme described in FIG. 5 requires many new external apparatuses such as a sender reflector and a test manager to be installed and operated in order to measure the quality of a network. And the existing network equipment performs a response according to its standard measurement scheme.

This scheme burdens a network operator with high capital expenditures (CAPEX) and operating expenses (OPEX) on external equipment for measuring the network quality. In addition, since the measurement is not performed in a desired network and performed using the external equipment, it is impossible to obtain accurate measurement results that occur in the network managed by the network operator. Although it is possible to obtain similar measurement results by placing the external measurement equipment near a desired network element, it is difficult to obtain accurate measurement results and further it is difficult to measure a problem caused by the network element itself.

In addition, the EMS that manages a network fails to directly perform measurement to obtain measurement results. Instead, the EMS may obtain measurement results through only the interface between the test manager and the EMS. Also, this measurement is dependent on a measurement protocol performed by an external tester, and the network quality measurement results are dependent on the function of the external tester. And also, the above scheme is difficult to apply to a new network platform such as SDN/NFV (network function virtualization) and may not simultaneously support various management platforms such as the EMS or a dedicated measurement server.

Further, the above measurement scheme needs an external interface for QoE measurement control and measurement result transmission so as to manage the QoE measurement in the OpenFlow based SDN structure. Also, since the QoE function itself is not a software-based platform in the typical scheme, it is not easy to realize the virtualized QoE function of the NFV type in the form of virtualized software.

FIGS. 6A to 6D are diagrams illustrating a quality management system according to various embodiments of the present invention.

Figure 6A:
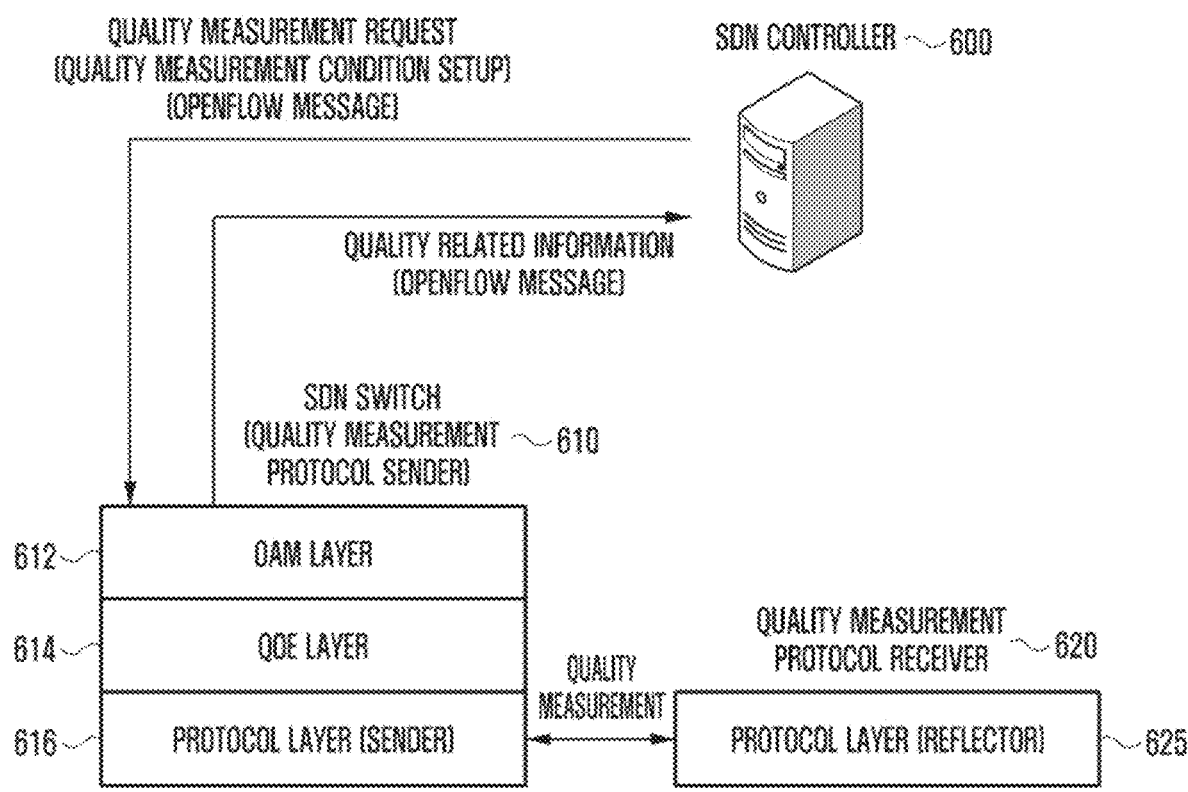

Specifically, FIG. 6A is a diagram illustrating elements that can be included in the quality management system, FIG. 6B is a flow diagram illustrating a process of measuring and managing quality in the quality management system, and FIG. 6C is an exemplary diagram illustrating an interface scheme between the quality management system and a user.

Referring to FIG. 6A, the quality management system may include an SDN controller 600, an SDN switch 610, and a quality measurement protocol receiver 620. The SDN switch 610 may include an operation and maintenance (OAM) layer 612, a QoE layer 614, and a protocol layer (sender) 616. The quality measurement protocol receiver 620 may include a protocol layer (reflector) 625.

The SDN controller 600 may set a quality measurement condition and transmit a quality measurement request message including the quality measurement condition to the SDN switch 610. The SDN switch 610 may measure quality with the quality measurement protocol receiver 620, based on the quality measurement condition, and then may create quality related information. The SDN switch 610 may transmit the created quality related information to the SDN controller 600.

The "quality measurement condition" may refer to a setting condition when the SDN controller 600 sends the quality measurement request message to the SDN switch. Specifically, information about the quality measurement condition may be received from the user. An example of the quality measurement condition is shown in FIG. 6C. In addition to this, the "quality measurement condition" may include service packet information that the user desires to be measured. The service packet information may include the type of a service and codec information of the service.

The "quality related information" may include information about a result of measuring quality on the basis of the quality measurement request message.

FIG. 6B is a diagram illustrating a process of transmitting and receiving a message between elements that can be included in the quality management system. Specifically, at step S630, the SDN controller 600 sets a quality measurement request message using a quality measurement condition received from a user, i.e., an application, and delivers the message to a sender for QoE measurement. In this case, the sender is the SDN switch 610 that supports OpenFlow. In addition, the quality measurement request message that is set using the quality measurement condition received from the application in the SDN controller may be delivered through an OpenFlow message extended for such a function. Namely, the SDN controller may extend the OpenFlow message to set indicators corresponding to the quality measurement condition and then transmit the extended message to the SDN switch.

Hereinafter, a method of measuring quality in the OAM layer 612, the QoE layer 614, and the protocol layer 616 constituting the SDN switch will be described in detail. Specifically, at step S630, the SDN controller 600 may transmit the quality measurement request message to the OAM layer 612 through the OpenFlow message. At step S635, the OAM layer 612 of the SDN switch may extract information about a quality measurement condition for QoE measurement by parsing the received OpenFlow message.

At step S640, the OAM layer 612 transmits the extracted information about the quality measurement condition to the QoE layer 614. At step S645, the QoE layer 614 may create a probe packet to match the received quality measurement condition. The probe packet may include a user traffic emulation packet. Also, the QoE layer 614 may encode information in a condition that meets a protocol (e.g., TWAMP, TWAMP-Light, Y.1731 PM, iPerf, ICMP, etc.) specification for measurement in the lower protocol layer 616.

Thereafter, at step S650, the QoE layer 614 may transmit, to the protocol layer 616, the standard probe packet encoded for a protocol to be used for measurement. In addition, at step S655, the protocol layer 616 may measure QoE along with the protocol layer 625 of the test protocol receiver 620 by using the standard probe packet. Specifically, the protocol layer 625 of the test protocol receiver 620 may receive the standard probe packet, encode information necessary for a receiver defined in the received standard probe packet, and return the standard probe packet to the protocol layer 616 of the sender corresponding to a sender in the standard probe packet. Here, since performing only a processable function with regard to the received standard probe packet, the test protocol receiver 620 does not need to have an SDN switch function and only has compatibility with the standard probe packet.

Thereafter, at step S660, the QoE layer 614 may receive the standard probe packet from the protocol layer 616 of the sender. At step S665, the QoE layer 614 may create quality related information by analyzing the received standard probe packet. The quality related information may include at least one of various metrics related to the network quality, information about a packet transmission delay time, event information when measuring the quality, and period information.

At step S670, the QoE layer 614 may transmit the created quality related information to the OAM layer 612. The OAM layer 612 may set and encode the quality related information created as a result of analysis to and in an OpenFlow message at step S675 so as to interwork with the SDN controller 600, and then may transmit the OpenFlow message to the SDN controller 600 at step S680. The OAM layer 612 may support the existing EMS and any server-type QoE controller as well as the SDN controller 600.

Next, at step S685, the SDN controller 600 may provide the user with the quality related information extracted by analyzing the received OpenFlow message. In addition, the SDN controller 600 may provide a network QoE analysis function through a graphical user interface (GUI) or the like, based on the analyzed quality related information.

Figure 6D:
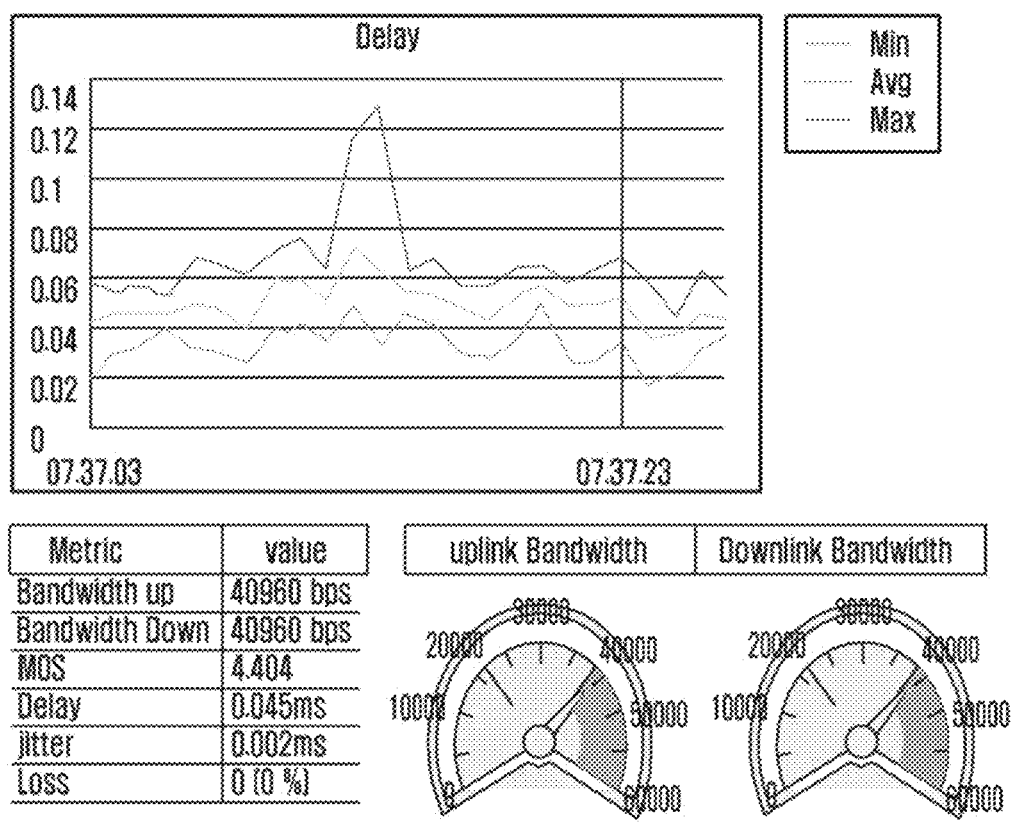

FIGS. 6C and 6D are diagrams illustrating interface schemes between the quality measurement management system and the user. Specifically, an example of setting a channel quality measurement condition and an example of showing a channel quality measurement result are illustrated. The user may set conditions for performing the quality measurement by using the GUI as shown in FIG. 6C, and as a result, the quality measurement management system may provide the user with the quality related information as shown in FIG. 6D.

Figure 7:
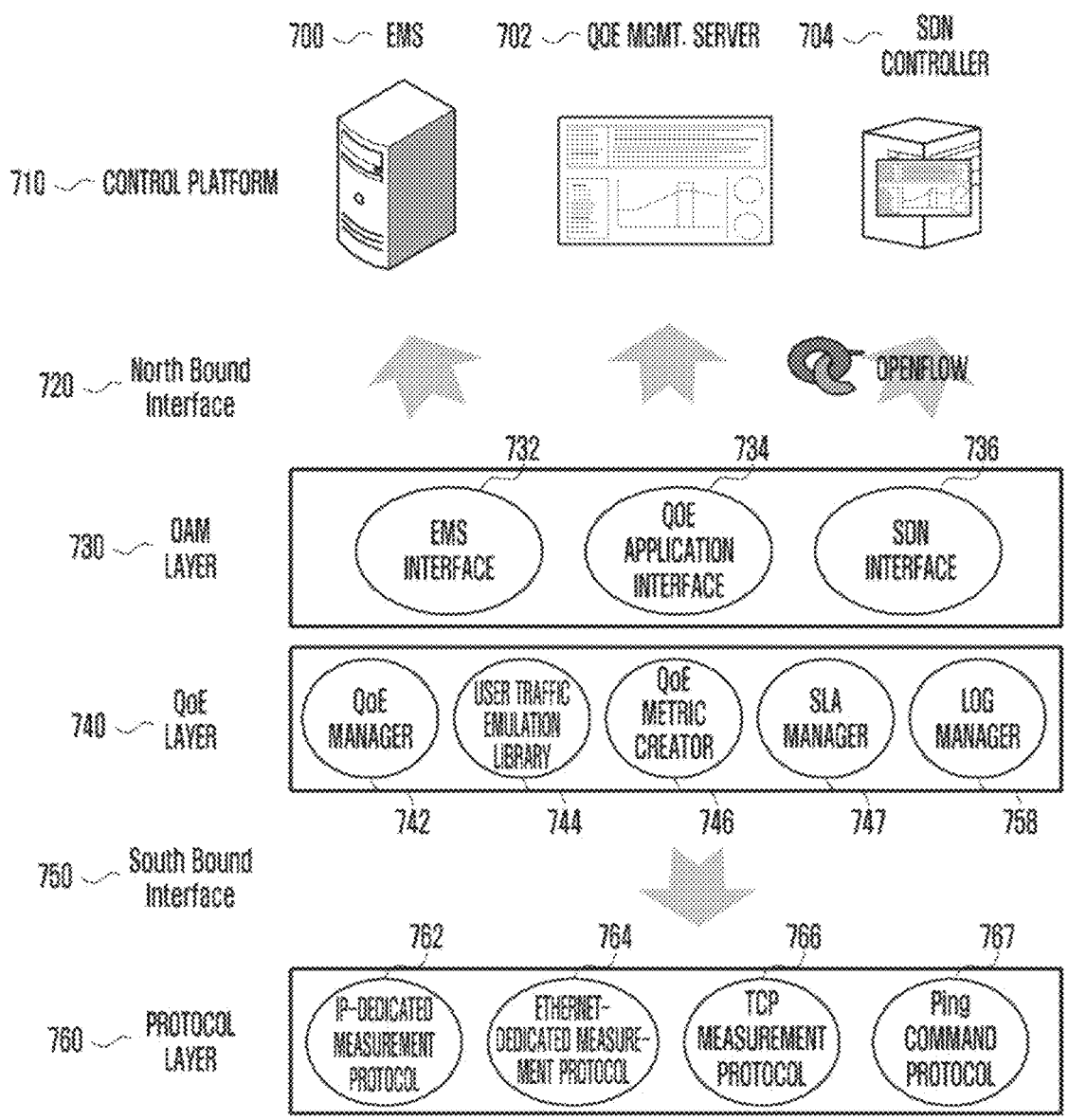
FIG. 7 illustrates a common platform apparatus for QoE measurement according to an embodiment of the present invention.

FIG. 7 illustrates a common platform apparatus for QoE measurement according to an embodiment of the present invention.

As described above, the present invention may support various upper level controllers and various lower level protocols in addition to the SDN controller. In order to support this structure, the SDN switch included in the quality measurement management system is layered and designed as a platform structure divided into a common part and a variable part. The upper level controllers supported by the quality measurement management system of the present invention may include an EMS 700, a QoE measurement dedicated server 702, and an SDN controller 704, which exist in a control platform 710. In addition, the lower level protocols supported by the quality measurement management system of the present invention may include TWAMP/TWAMP-Light, Y.1731 PM, ICMP, iPerf, and the like.

The quality measurement management system may include an OAM layer 730, a QoE layer 740, and a protocol layer 760, which exist in the SDN switch. In addition, the quality measurement management system may include a north bound interface 720 for communication between the control platform 710 and the OAM layer 720, and may also include a south bound interface 750 for communication between the QoE layer 740 and the protocol layer 760.

The OAM layer 730 communicates with various upper controllers through the north bound interface 720, and each interface layer for communicating with the upper control platform 710 operates in the OAM layer 730. Such an interface may include an EMS interface 732, a QoE application interface 734, and an SDN interface 736.

The QoE layer 740 may play a key role in QoE management. Specifically, in order to accommodate variously the northbound interface 720 and the southbound interface 750, an API for quality measurement is shared, a library of information that requires quality measurement is made, and an abstraction function for each measurement protocol may be provided. In addition, a user traffic emulation library is provided for various emulation functions of user traffic.

Specifically, the QoE layer 740 may include a QoE manager 1, a user traffic emulation library 744, a QoE metric creator 746, a service level agreement (SLA) manager 747, and a log manager 749.

The QoE manager 742 is responsible for the overall interface flow, and performs a function of interworking with the OAM layer 730 and the lower protocol layer 760 to interwork with the upper level control system.

The user traffic emulation library 744 may store a table, as shown in FIG. 9, which explains a mapping relation regarding whether to set a quality measurement condition including a specific measurement parameter, for the user traffic emulation function for a specific service in the mobile communication system.

The QoE metric creator 746 may create a QoE metric, based on information received from the lower protocol. The QoE metric creator 746 may extract and process common information for the creation of the QoE metric from the quality related information for each protocol to perform a function that is not dependent on the protocol.

The SLA manager 747 performs a function of analyzing the SLA for a predefined threshold value with regard to each created metric. For example, if the SLA defines a packet delay time as "excellent" for 50 msec or less, as "good" for 50 msec to 150 msec, and as "bad" for 150 msec or more, the SLA manager 747 analyzes and informs a section which a real-time measured result belongs to.

The log manager 749 creates and stores information about various events (warning, error, etc.), raw data, and a periodic or summary analysis result, which occur at the creation of the quality related information. A comma-separated value (CSV) format for interworking with Excel as well as a basic text format is supported for the creation.

The protocol layer 760 performs measurement according to an operation defined for each supportable standard protocol (TWAMP/TWAMP-Light, Y.1731 PM, ICMP, iPerf). The QoE layer 740 may control the lower protocol layer 760 through the south bound interface 750 for abstracting various measurement protocols. Specifically, the protocol layer 760 may include an IP-dedicated measurement protocol 762, an Ethernet-dedicated measurement protocol 764, a TCP measurement protocol 766, and a ping command protocol 768.

Figure 8:
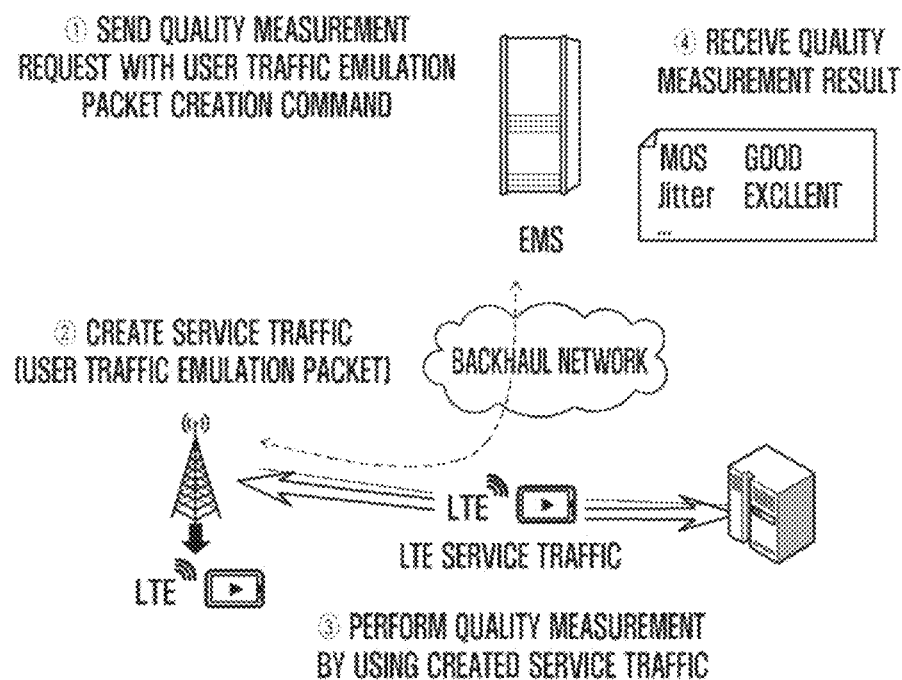
FIG. 8 illustrates a quality measurement process using a user traffic emulation packet in a quality management system according to an embodiment of the present invention.

FIG. 8 illustrates a quality measurement process using a user traffic emulation packet in a quality management system according to an embodiment of the present invention.

In case of measuring the quality of a network by using a standard probe packet for quality measurement, the most accurate analysis is possible if the quality of the network can be measured under the same condition as that of a service actually operated in the network. Creating a packet having the same condition as that of the service actually operated in the network is referred to as a user traffic emulation function. The user traffic emulation function is a function of, when a user selects a profile for a desired service to be measured, automatically creating a user traffic emulation packet to match the traffic type of the selected service, rather than setting measurement conditions of various parameters for QoE measurement with regard to complicated and generalized traffic flowing in the mobile communication network.

Specifically, the EMS may send a quality measurement request to a service traffic creator along with a user traffic emulation packet creation command via the backhaul network. The service traffic creator that receives the quality measurement request may create service traffic, i.e., the user traffic emulation packet, based on the quality measurement request, and then perform the quality measurement between network nodes by using the service traffic. Finally, the service traffic creator may transmit a result of performing the quality measurement to the EMS. The transmitted quality measurement result may be provided to the user.

When the user desires to measure the quality between the network nodes for voice over long term evolution (VoLTE) or video traffic through the above-described user traffic emulation function, a service traffic emulation packet that actually imitates this service is automatically created to measure QoE to a degree similar to traffic actually serviced in the network.

FIG. 9 is a diagram illustrating a table used for creating a user traffic emulation packet according to an embodiment of the present invention.

Specifically, FIG. 9 shows a table that explains a mapping relation regarding whether to have to set a quality measurement condition including specific measurement parameters, for a user traffic emulation function for a specific service in the mobile communication system. The table shown in FIG. 9 may be stored in the user traffic emulation library of the QoE layer of the SDN switch.

When service packet information to be measured is received from the user, the SDN controller transmits the service packet information to the QoE layer through the OAM layer. The service packet information may include the type of the service and codec information (subtype option) used in the service. The QoE layer may automatically set information for imitating traffic of the service to be measured and then create a service traffic emulation packet by using the table stored in the user traffic emulation library. As shown in FIG. 9, the information for imitating the traffic of the service to be measured may include at least one of a UDP differentiated services code point (DSCP), a packet size, a packet transfer rate (packet per second, PPS), and a bandwidth (kilobyte per second, kbps).

Figure 10:
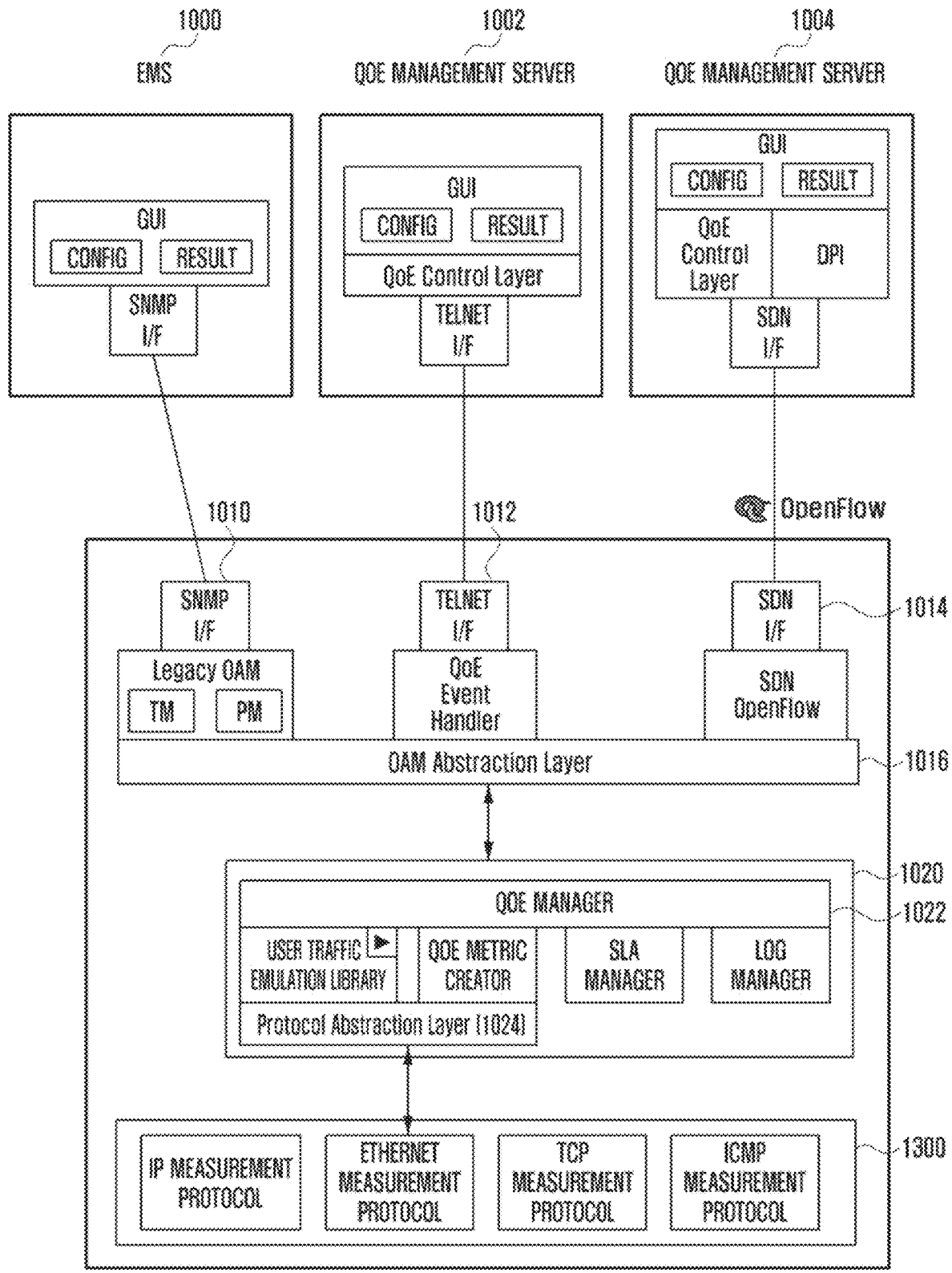
FIG. 10 is a diagram illustrating the structure of an extended QoE management system according to an embodiment of the present invention.

FIG. 10 is a diagram illustrating the structure of an extended QoE management system according to an embodiment of the present invention.

In order to accommodate various QoE management systems, blocks of the OAM layer that interwork with the respective control systems are connected to interfaces with upper controllers. Specifically, an EMS server 1000 is connected to a simple network management protocol (SNMP) interface 1100, a QoE management server 1002 is connected to a telnet interface 1102, and an SDN controller 1004 is connected to an SDN overflow interface 1104.

The OAM layer interworks with the QoE manager 1200 of the QoE layer through an OAM abstraction layer 1106 to enable QoE communication with different controllers. The QoE layer interfaces with the protocol layer 1300 through a protocol abstraction layer 1205 to extract the quality measurement condition, perform the service traffic emulation function, and perform the QoE metric creation function, as described above, by interworking with lower various measurement protocols.

Figure 11:
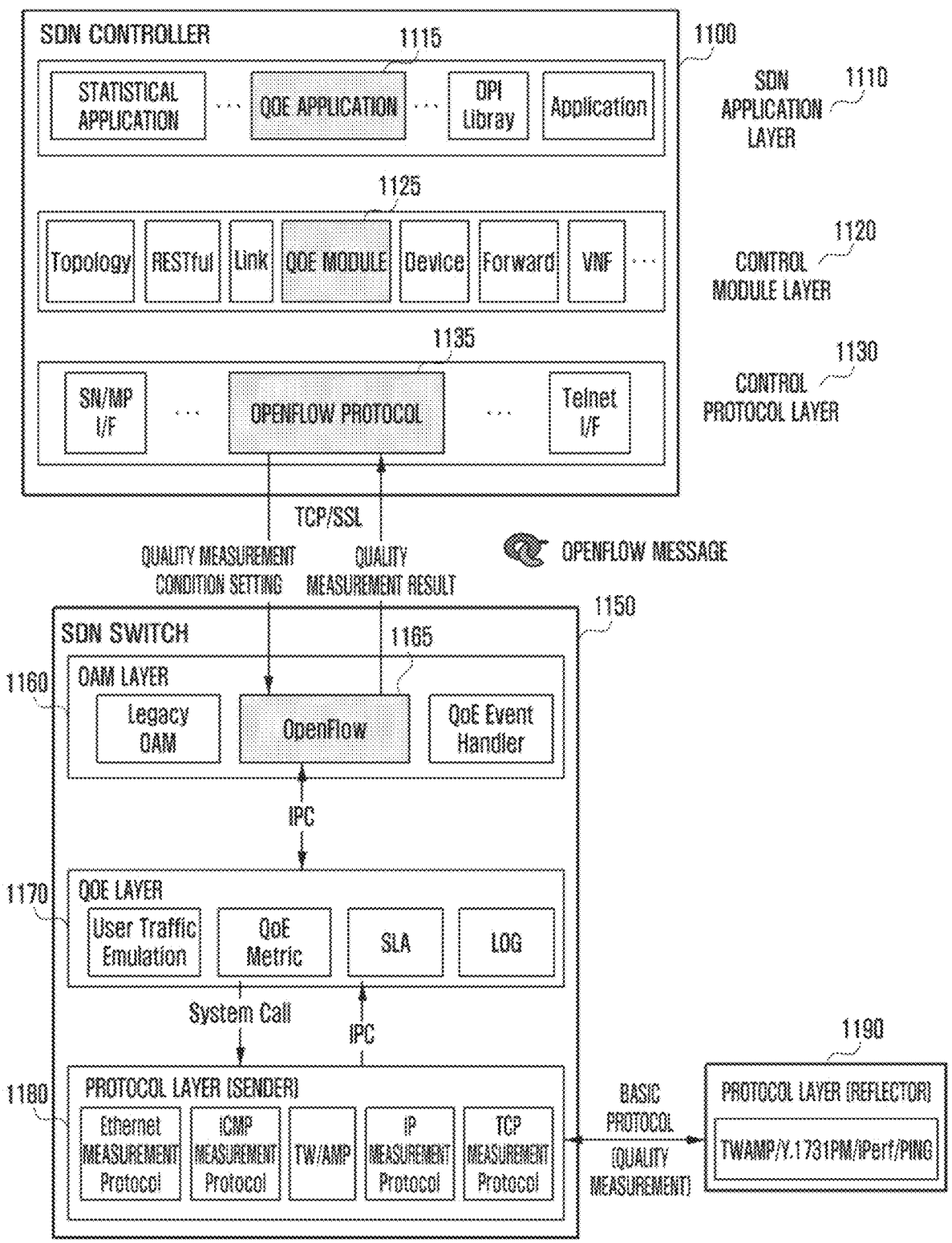
FIG. 11 is a block diagram illustrating details of QoE measurement and management in the SDN structure according to an embodiment of the present invention.

FIG. 11 is a block diagram illustrating details of QoE measurement and management in the SDN structure according to an embodiment of the present invention.

Specifically, FIG. 11 illustrates an interface between detailed blocks for measuring and managing QoE in the SDN structure.

A QoE application 1115 for QoE processing in an SDN application layer 1110 of an SDN controller 1100 may receive various quality measurement conditions such as diagnosis and statistics from the user. The application may receive the various quality measurement conditions through a graphical user interface (GUI).

A QoE module 1125 of a controller module layer 1120 provides an interface between the QoE application 1115 and an OpenFlow protocol 1135. A control protocol layer 1130 performs an operation of encoding and decoding a quality request message to be transmitted to the SDN switch and quality related information received from the SDN switch in order to process a message for QoE measurement in the OpenFlow protocol extended for the QoE measurement.

An OAM layer 1160 of the SDN switch may extract specific parameters of the quality measurement condition by parsing the received extended OpenFlow message. Also, the OAM layer 1160 delivers the extracted quality measurement condition to a QoE layer 1170. Operations in the QoE layer 1170 and the protocol layer 1180 are the same as those described above with reference to FIGS. 6 and 7. The quality related information created in the QoE layer 1170 based on a QoE measurement result may be set in an OpenFlow message by the SDN switch in order to be delivered to the SDN controller. The set OpenFlow message may be encoded and then delivered to the SDN controller 1100.

The SDN controller may parse the received extended OpenFlow message and deliver the quality related information, namely, the quality measurement result, to the SDN application 1115. Finally, the SDN application 1115 may provide the quality related information to the user in the form of GUI or log.

A basic difference from the existing SDN structure is that the OpenFlow protocol of the existing SDN structure is used to control operations in the data plane including a path of a packet passing through the SDN switch, whereas the extended OpenFlow protocol of the present invention delivers information into the SDN switch for QoE measurement and allows a control through this. This conceptual changeover may be used for various application services besides the QoE measurement.

Hereinafter, the extension of an OpenFlow message for measuring and managing QoE will be described in detail with reference to FIGS. 12 to 15.

Figure 12:
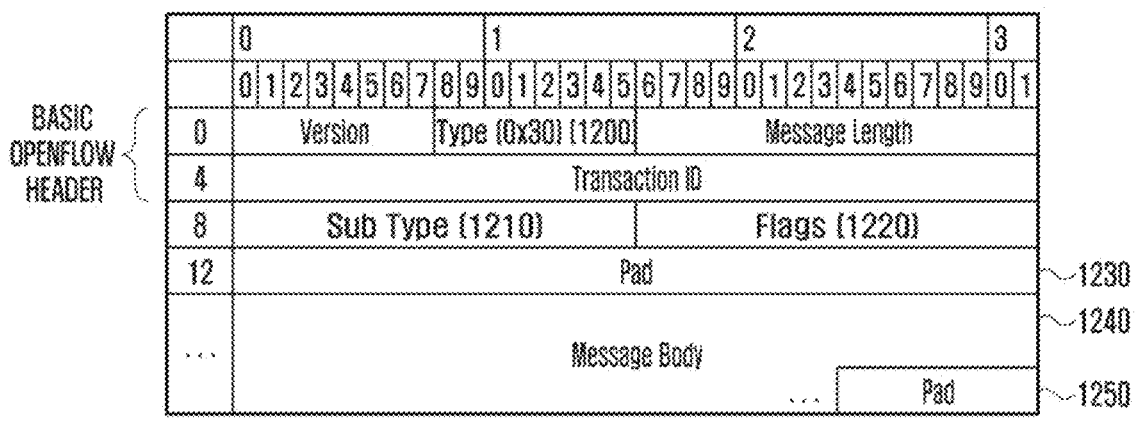
FIG. 12 is a diagram illustrating the extension of an OpenFlow message for QoE measurement according to an embodiment of the present invention.

FIG. 12 is a diagram illustrating the extension of an OpenFlow message for QoE measurement according to an embodiment of the present invention.

An extended OpenFlow message may be formed of 'QoE Test Request' and 'QoE Test Reply', and the 'QoE Test Request' may be classified into 'START' and 'STOP' operations. The 'QoE Test Request' may include a quality measurement request message including a quality measurement condition in the present invention, and the 'QoE Test Reply' may include quality related information in the present invention, namely, a message for a quality measurement result.

The extended message format described in FIG. 12 is based on TWAMP among various protocols available for the quality management system. As described above, the above method may be applied to various measurement protocols.

The extended OpenFlow message may be divided into a standard OpenFlow header part and a message part. An OpenFlow header uses the structure of a standard OpenFlow header as it is. In particular, the value of a "Type" field 1200 may be set to 0x30 to show the extended OpenFlow message for quality measurement in the SDN as indicated by a reference numeral 1205. The message part includes a "Sub Type" field 1210, a "Flags" field 1220, and a message body field. The meaning of each field in the message is as follows.

First, the "Sub Type" field 1210 is formed of 16 bits and indicates whether a message is a quality measurement request message or quality related information (i.e., a reply message in response to a quality measurement request). In case of TWAMP, message types according to values of Sub Type are as follows (See a reference numeral 1215).

"0x0100" denotes a reply message for delivering a CPU usage ratio.

"0x0101" denotes a QoE test request message using TWAMP.

"0x0102" denotes a reply message for delivering a request message reply and a test result.

Next, the "Flags" field is formed of 16 bits and indicates operations in accordance with the request message and the reply message. The operations according to values of Flags are as follows (See a reference numeral 1225).

"1<<0" is used in the "QoE Test Request" message and requests the stop of a QoE test being performed.

"1<<1" is used in the "QoE Test Request" message and requests the start of a QoE test.

"1<<2" is used in the "QoE Test Reply" message and acknowledges the request message.

"1<<3" is used in the "QoE Test Reply" message and delivers various errors occurring during the QoE test.

"1<<4" is used in the "QoE Test Reply" message and delivers a periodical analysis of measurement results while the QoE test is performed.

"1<<5" is used in the "QoE Test Reply" message and delivers a summary analysis of measurement results after the QoE test is completed.

Next, a "Pad" field 1230 is formed of 32 bits and is a field for a future extension of the OpenFlow message. The "Message Body" field 1240 is formed of variable bits and may include data in accordance with the Sub Type field and the Flags field. Another "Pad" field 1250 is formed of variable bits and may be added to the end of the "Message Body" field 1240 to match the length of the extended OpenFlow message in 32-bit unit.

Figure 13A:
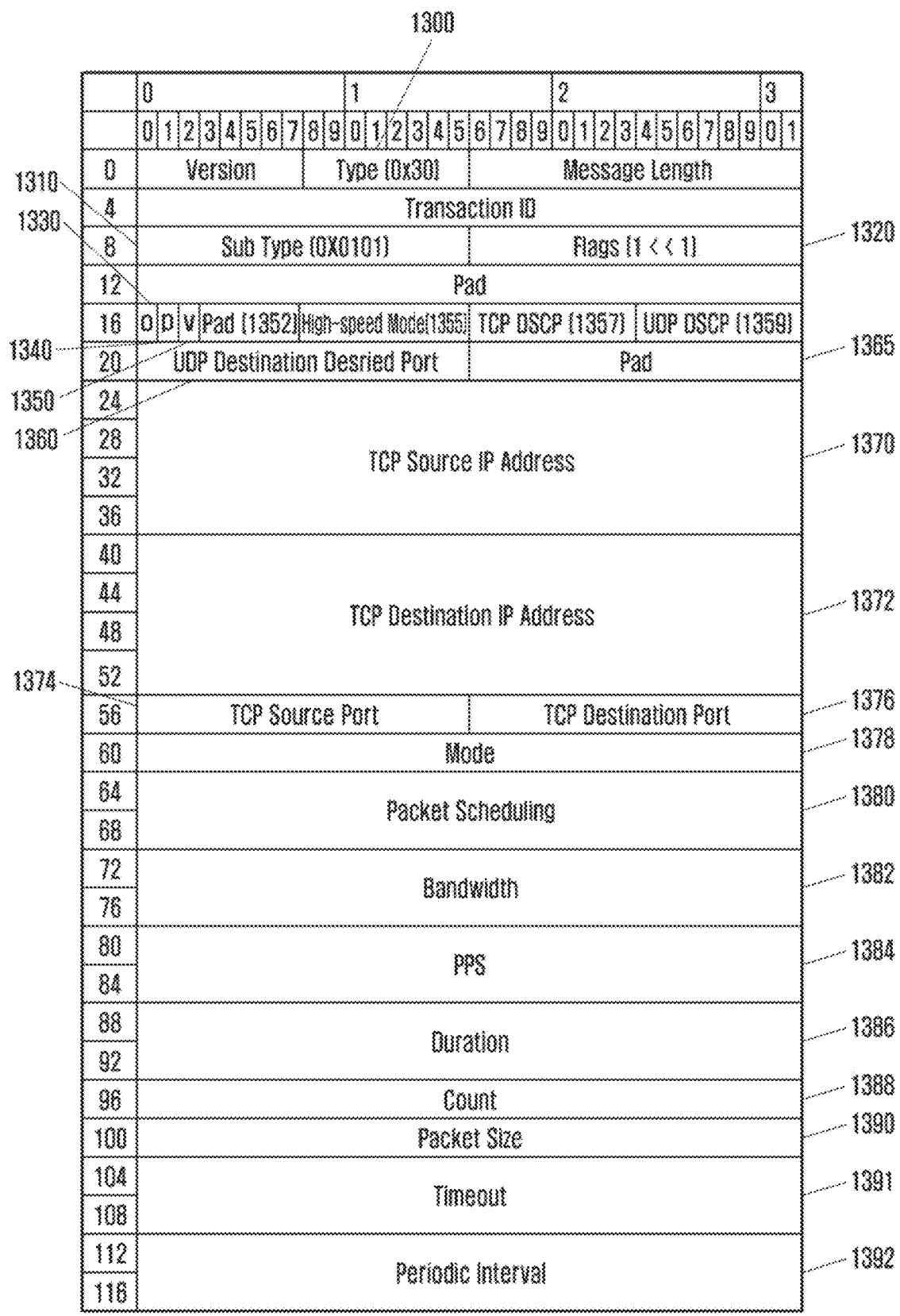

FIGS. 13A and 13B are diagrams illustrating an OpenFlow message according to various embodiments of the present invention.

Specifically, FIG. 13A illustrates the format of a 'QoE Test Start' request message in case of starting measurement using a TWAMP protocol, and FIG. 13B is a table that shows information indicated by values of each field in the QoE test start request message. Basically, essential information for measurement with TWAMP, i.e., measurement condition information, is encoded in and transmitted through an extended OpenFlow message.

As indicated by a reference numeral 1393, the value of a "Type" field 1300 is set to "0x30" in order to indicate that the OpenFlow message is a message for quality measurement. As indicated by a reference numeral 1394, the value of a "Sub Type" field 1310 is set to "0x0101" in order to indicate a "TWAMP Test Request message". As indicated by a reference numeral 1395, the value of a "Flags" field 1320 is set to "1<<1" in order to indicate a message that requests the measurement start.

In the "Message Body" field part there are various kinds of measurement condition information for TWAMP measurement. Upon receiving a 'TWAMP Test START' request message, the SDN switch parses the message and, based on the measurement condition information in the message, starts TWAMP quality measurement. The meaning of each field in the "Message Body" field part is as follows.

An "Operation (o)" field 1330 is formed of 1 bit and indicates an operation mode of the TWAMP quality measurement. Specifically, the value of "0" denotes an operation stop, and the value of "1" denotes an operation start. As indicated by a reference numeral 1396, the 'TWAMP Test START' request message should have a field value of 1.

A "Periodic Flag (p)" field 1340 is formed of 1 bit and indicates whether the SDN switch should transmit a periodical analysis to the SDN controller during the TWAMP quality measurement. As indicated by a reference numeral 1397, the value of "0" denotes no transmission of the periodic analysis, and the value of "1" denotes transmission of the periodic analysis.

An "IP (internet protocol) Version (v)" field 1350 is formed of 1 bit and indicates the version of source IP and destination IP addresses to be used in the TWAMP quality measurement. As indicated by a reference 1397, the value of "0" denotes that the IP version is "6", and the value of "1" denotes that the IP version is "4".

A "Pad" field 1352 is formed of 5 bits and is a field for a future extension of the OpenFlow message (1398).

A "High-speed Mode" field 1355 is formed of 8 bits and indicates whether or not a high-speed measurement mode is used during the TWAMP quality measurement. In case of performing the quality measurement using the high-speed measurement mode, it is possible to lower a usage ratio of the central processing unit (CPU) of the sender, i.e., the SDN switch, because of not calculating specific metrics (e.g., delay, jitter, etc.). In case of using the high-speed measurement mode, the non-calculated metrics are not output to the measurement result.

A "transmission control protocol (TCP) differentiated services code point (DSCP)" field 1357 is formed of 8 bits and indicates a DSCP value to be used in the TCP connection.

A "user datagram protocol (UDP) DSCP" field 1359 is formed of 8 bits and indicates a DSCP value to be used in the UDP connection.

A "UDP Destination Desired Port" field 1360 is formed of 16 bits and indicates a UDP port requested to be used in the TWAMP reflector during the quality measurement. If the corresponding port is unavailable in the TWAMP reflector, another port may be automatically assigned to perform the quality measurement.

A "Pad" field 1365 is formed of 16 bits and is a field for a future extension.

A "TCP Source IP Address" field 1370 is formed of 128 bits and indicates the IP address of the sender for the TWAMP quality measurement. Depending on the value of the "IP version (v)" field 1350, the IP address of IPv4 or IPv6 is indicated.

A "TCP Destination IP Address" field 1372 is formed of 128 bits and indicates the IP address of the reflector for the TWAMP quality measurement. Depending on the value of the IP version field, the IP address of IPv4 or IPv6 is indicated.

A "TCP Source Port" field 1374 is formed of 16 bits and indicates a port of the sender to be used in the TWAMP control, i.e., a port of the protocol layer in the SDN switch.

A "TCP Destination Port" field 1376 is formed of 16 bits and indicates a port of the reflector to be used in the TWAMP control.

A "Mode" field 1378 is formed of 32 bits. Since only one of three parameters, Packet Scheduling, Bandwidth and PPS, should be set and also only one of Duration and Count should be set in the TWAMP quality measurement condition, the Mode field indicates which of five conditions are set.

A "Packet Scheduling" field 1380 is formed of 64 bits and indicates how many seconds the sender will send the standard probe packet in the TWAMP quality measurement.

A "Bandwidth" field 1382 is formed of 64 bits and indicates the bandwidth in the TWAMP quality measurement.

A "PPS (packet per second)" field 1384 is formed of 64 bits and indicates how many standard probe packets per second are to be sent by the sender in the TWAMP quality measurement.

A "Duration" field 1386 is formed of 64 bits and indicates a time to perform the TWAMP quality measurement.

A "Count" field 1388 is formed of 32 bits and indicates the total number of quality probe packets to be transmitted by the sender in the TWAMP quality measurement.

A "Packet Size" field 1390 is formed of 32 bits and indicates the total size of the quality probe packet to be used in the TWAMP quality measurement.

A "Timeout" field 1391 is formed of 64 bits and indicates a time for determining that the quality probe packet transmitted by the sender is lost in the TWAMP quality measurement.

A "Periodic Interval" field 1392 is formed of 64 bits and indicates an interval of sections for obtaining a periodic analysis in the TWAMP quality measurement.

Figure 14A:
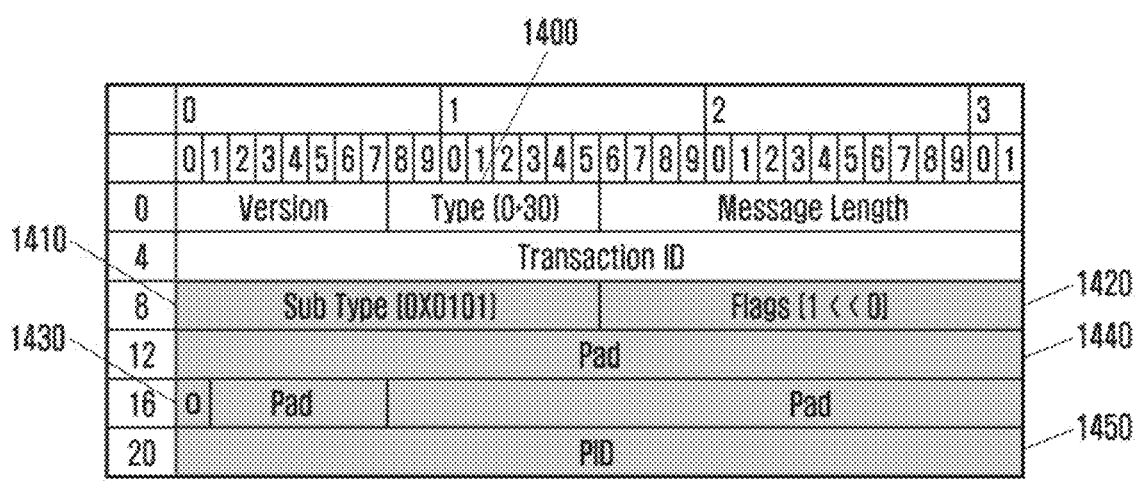

FIGS. 14A and 14B are diagrams illustrating an OpenFlow message according to various embodiments of the present invention.

Specifically, FIG. 14A illustrates the format of a 'QoE Test Stop' request message in case of stopping measurement using the TWAMP protocol, and FIG. 14B is a table that shows information indicated by values of each field in the QoE test stop request message.

As indicated by a reference numeral 1405, the value of a "Type" field 1400 is set to "0x30" in order to indicate that the OpenFlow message is a message for quality measurement. As indicated by a reference numeral 1415, the value of a "Sub Type" field 1410 is set to "0x0101" in order to indicate a "TWAMP Test Request message". As indicated by a reference numeral 1425, the value of a "Flags" field 1420 is set to "1<<0" in order to indicate a message that requests the measurement stop.

In the "Message Body" field part there is a "process identifier (PID)" field to be used to stop the quality measurement. Upon receiving the 'QoE Test Stop' request message, the SDN switch parses the message and steps a quality measurement process corresponding to the PID in the message. The meaning of each field in the "Message Body" field part is as follows.

An "Operation (o)" field 1430 is formed of 1 bit and indicates an operation mode of the QoE quality measurement. As indicated by a reference numeral 1435, the 'QoE Test Stop' request message should have a field value of 0.

A "Pad" field 1440 is formed of 32 bits and is a field for a future extension.

A "process identifier (PID)" field 1450 is formed of 32 bits and indicates the PID of a quality measurement process to be stopped.

Figure 15A:
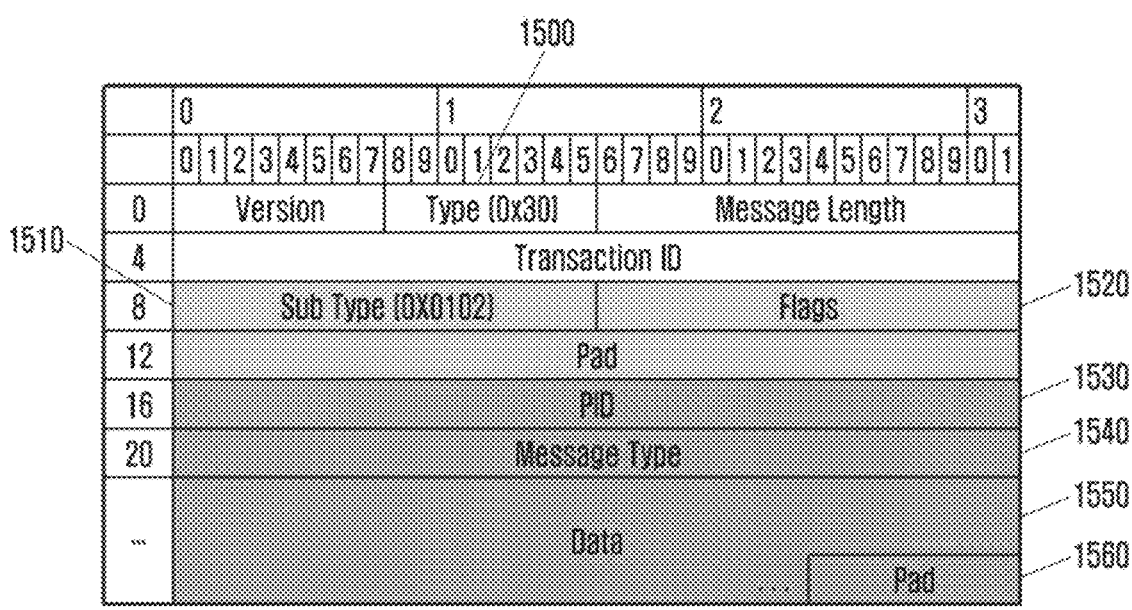

FIGS. 15A to 15C are diagrams illustrating an OpenFlow message according to various embodiments of the present invention.

FIGS. 15A to 15C illustrate the format of a 'QoE Test Reply' message for transmission of a measurement result to the SDN controller after quality is measured with each QoE protocol.

Specifically, FIG. 15A illustrates the format of the 'QoE Test Reply' message for transmitting a measurement result or reporting an error to the SDN controller after quality measurement with each QoE protocol in the SDN switch, and FIG. 14B is a table that shows information indicated by values of each field in the QoE test reply message. FIG. 15C is a table that specifies values of a "Message Type" field 1530 in FIG. 14B. The meaning of each field is as follows.

As indicated by a reference numeral 1505, the value of a "Type" field 1500 is set to "0x30" in order to indicate that the OpenFlow message is a message for quality measurement. As indicated by a reference numeral 1515, the value of a "Sub Type" field 1510 is set to "0x0102" in order to indicate a TWAMP quality measurement reply message. As indicated by a reference numeral 1525, the values of a "Flags" field 1520 are set depending on operations of the TWAMP quality measurement reply message.

A "PID" field 1530 is formed of 32 bits and indicates the PID of a QoE quality measurement process of delivering a measurement result in the SDN switch.

A "Message Type" field 1540 is formed of 32 bits and indicates the type of the 'QoE Test Reply" message. The value of the "Flags" field 1520 is set depending on the message type, and contents such as an error, an ACK, a summary analysis, and a periodic analysis may be contained in a data field depending on the value of the "Flags" field 1520. Details are as follows.

When the value of the "Message Type" field is "−1", this indicates an error that occurs during the QoE quality measurement. Such an error is represented in the format of 'Date; Time; Severity; Description' in the data field.

When the value of the "Message Type" field is "0", this indicates an acknowledge (ACK) for the 'QoE Test Request' message.

When the value of the "Message Type" field is "100", this indicates a summary analysis of results of performing the TWAMP quality measurement, which is represented in the CSV format in the data field.

When the value of the "Message Type" field is "101", this indicates a summary analysis of results of performing the TWAMP quality measurement, which is represented in the text format in the data field.

When the value of the "Message Type" field is "102", this indicates a summary analysis of results of performing the TWAMP quality measurement using the high-speed mode, which is represented in the CSV format in the data field.

When the value of the "Message Type" field is "103", this indicates a summary analysis of results of performing the TWAMP quality measurement using the high-speed mode, which is represented in the text format in the data field.

When the value of the "Message Type" field is "104~199", this is a reserved value for indicating a summary analysis of results of performing quality measurement using a certain protocol other than the TWAMP protocol.

When the value of the "Message Type" field is "200", this indicates a periodic analysis of results of performing the TWAMP quality measurement, which is represented in the CSV format in the data field.

When the value of the "Message Type" field is "201", this indicates a periodic analysis of results of performing the TWAMP quality measurement, which is represented in the text format in the data field.

When the value of the "Message Type" field is "202", this indicates a periodic analysis of results of performing the TWAMP quality measurement using the high-speed mode, which is represented in the CSV format in the data field.

When the value of the "Message Type" field is "203", this indicates a periodic analysis of results of performing the TWAMP quality measurement using the high-speed mode, which is represented in the text format in the data field.

When the value of the "Message Type" field is "204~299", this is a reserved value for indicating a periodic analysis of results of performing quality measurement using a certain protocol other than the TWAMP protocol.

A "Data" field 1550 is formed of a variable size, and contents depending on the message type are contained to match each format in the "Data" field 1550.

A "Pad" field 1560 is formed of variable size and may be added to the end of the data field to match the length of the 'QoE Test Reply' message in 32-bit units.

Figure 16:
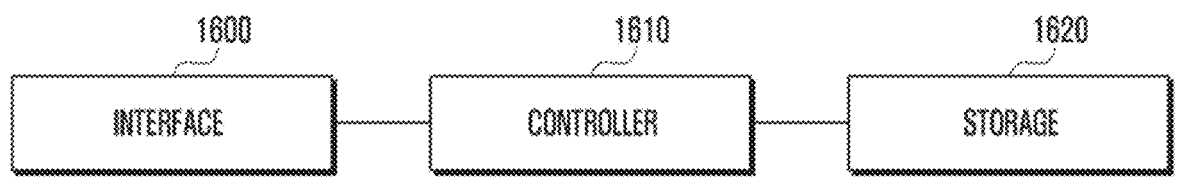
FIG. 16 is a block diagram illustrating an internal structure of a quality management apparatus according to an embodiment of the present invention.

FIG. 16 is a block diagram illustrating an internal structure of a quality management apparatus according to an embodiment of the present invention.

As shown in FIG. 16, the quality management apparatus may include an interface 1600, a controller 1610, and a storage 1620. The interface 1600 may be connected to other apparatuses to transmit and receive information necessary for a quality management. The interface 1600 may receive a quality measurement condition from a user. The interface 1600 may be connected to an SDN switch and transmit a quality measurement request message, which is set using the received quality measurement condition, through an OpenFlow message. In addition, the interface 1600 may receive quality related information, which is a result of measuring a quality between network nodes by using the quality measurement condition, from the SDN switch through the OpenFlow message.

The controller 1610 may control receiving, from a QoE management apparatus, the quality measurement request message created by using the quality measurement condition received from the user. Also, the controller 1710 may create quality related information by measuring a quality with other network node, based on the received quality measurement condition, and control transmitting the quality related information to the QoE management apparatus. In particular, the controller 1610 may perform the above operations in an SDN application layer, a control module layer, and/or a control protocol layer in the quality management apparatus.

When setting the quality measurement request message, the controller 1610 may set an indicator for indicating the quality measurement request message of a protocol to be measured in the OpenFlow message, an indicator for indicating a start of the quality measurement, and an indicator for indicating the received quality measurement condition. If the quality measurement condition includes service packet information desired to be measured when setting the quality measurement request message, the controller 1610 may set the quality measurement request message based on the service packet information.

The storage 1620 may store information necessary for the controller 1610 to perform an operation. The storage 1620 is connected to the interface 1600 and may store information received from the user. The storage 1620 may previously store information about parameters necessary for setting the OpenFlow message.

Figure 17:
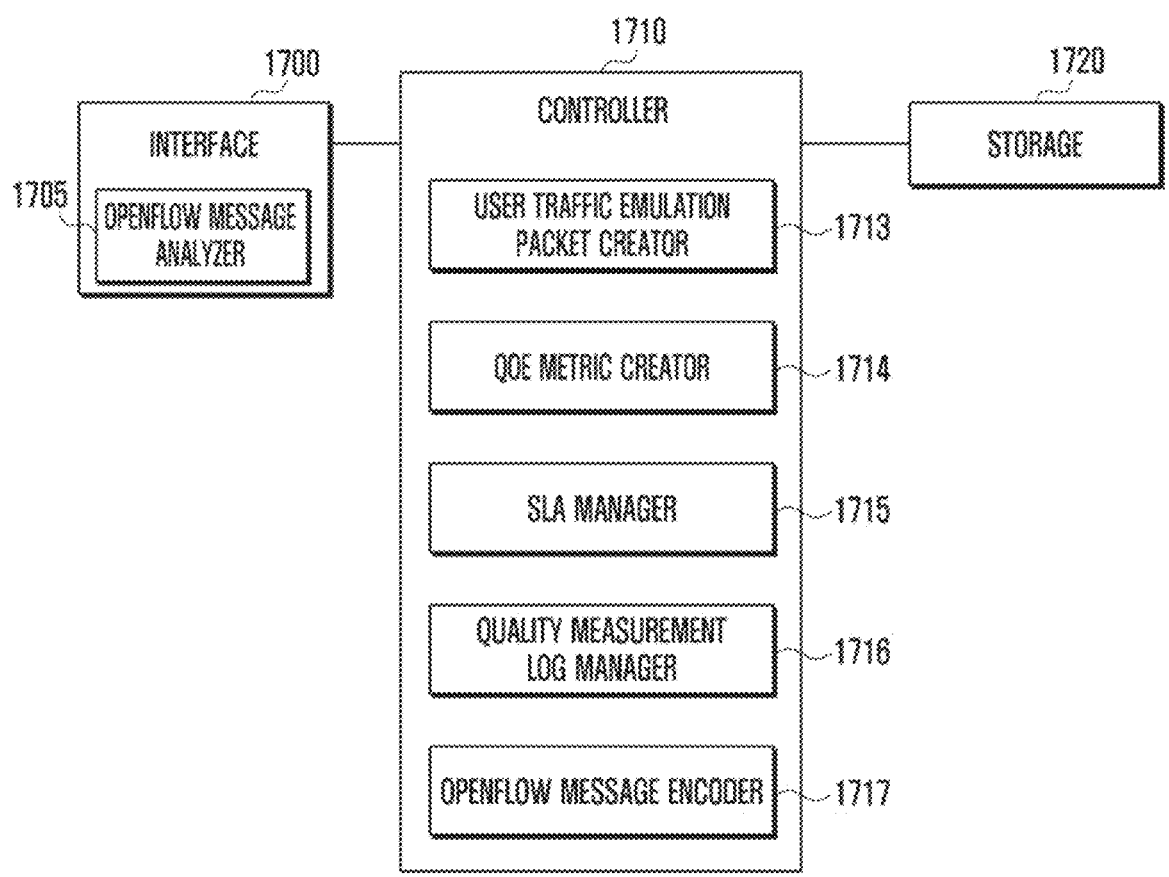
FIG. 17 is a block diagram illustrating an internal structure of a quality measurement apparatus according to an embodiment of the present invention.

FIG. 17 is a block diagram illustrating an internal structure of a quality measurement apparatus according to an embodiment of the present invention.

As shown in FIG. 17, the quality measurement apparatus may include an interface 1700, a controller 1710, and a storage 1720. The interface 1700 may include an OpenFlow message analyzer 1705. The controller 1710 may include a user traffic emulation packet creator 1713, a quality of experience (QoE) metric creator 1714, a service level agreement (SLA) manager 1715, a quality measurement log manager 1716, and an OpenFlow message encoder 1717.

The interface 1700 may transmit and receive information necessary for a quality measurement. The interface 1700 may receive a quality measurement request message from an SDN controller through an OpenFlow message. The quality measurement request message may include a quality measurement condition. The interface 1700 may receive the quality measurement request message from the SDN controller and any other control apparatus. The interface 1700 may transmit a quality probe packet for measuring quality with other network node. The interface 1700 may support various upper level control apparatuses and various lower level protocols.

The OpenFlow message analyzer 1705 included in the interface 1700 may parse the OpenFlow message received by the interface 1700 and extract the quality measurement information. The operation of the OpenFlow message analyzer 1705 may be also performed by the interface 1700 itself.

The controller 1710 may control receiving, from a QoE management apparatus, the quality measurement request message created by using the quality measurement condition received from the user. Also, the controller 1710 may create quality related information by measuring a quality with other network node, based on the received quality measurement condition, and control transmitting the quality related information to the QoE management apparatus.

If the quality measurement condition includes service packet information desired to be measured, the controller 1710 may measure the quality with the other network node by using a user traffic emulation packet created based on the service packet information. The controller 1710 may control the creation of the user traffic emulation packet, based on the service packet information including service type information and service codec information and pre-stored packet creation information.

When measuring the quality with the other network node, the controller 1710 may encode the user traffic emulation packet to match at least one protocol, based on the quality measurement condition. Also, the controller 1710 may extract common information from quality measurement results for the at least one protocol and then create a QoE metric to be included in the quality related information.

When creating the quality related information, the controller 1710 may set fields in the OpenFlow message, based on the quality related information. In addition, the controller 1710 may further control receiving at least one quality measurement request message from at least one quality measurement apparatus, and measuring the quality with other network node by processing the received at least one quality measurement request message.

If the received quality measurement condition includes service packet information desired to be measured, the user traffic emulation packet creator 1713 included in the controller 1710 may create the user traffic emulation packet based on the service packet information when the quality with the other network node is measured. The controller 1710 may control the creation of the user traffic emulation packet, based on the service packet information including service type information and service codec information and pre-stored packet creation information. The pre-stored packet creation information may include a user traffic emulation library.

The QoE metric creator 1714 included in the controller 1710 may create the QoE metric, based on information received from the lower protocol. The QoE metric creator 746 may extract and process common information for the creation of the QoE metric from the quality related information for each protocol to perform a function that is not dependent on the protocol.

The SLA manager 1715 included in the controller 1710 performs a function of analyzing an SLA for a predefined threshold value with regard to each created metric. For example, based on a packet delay time, the SLA manager 1715 may provide section information according to the threshold value.

The quality measurement log manager 1716 included in the controller 1710 may create and store information about various events (warning, error, etc.), raw data, and a periodic or summary analysis result, which occur at the creation of the quality related information. The OpenFlow message encoder 1717 included in the controller 1710 may encode the created quality related information and set it to the OpenFlow message. The operations performed by the above elements included in the controller 1710 may be also performed by the controller 1710 itself.

The storage 1720 may store information necessary for the quality measurement apparatus to perform the quality measurement. The storage 1720 may store the quality measurement request message received from the SDN controller or any other control apparatus. The storage 1720 may provide the stored message to the controller 1710. The storage 1720 may previously store information necessary for creating the user traffic emulation packet. The storage 1720 may previously store information necessary for creating the QoE metric.

The storage 1720 may previously store information necessary for providing information about the SLA. The storage 1720 may previously store information necessary for managing the quality measurement log. The storage 1720 may previously store information necessary for encoding the OpenFlow message.

The present invention provides a system and apparatus for measuring QoE of network equipment by utilizing various standard measurement protocols in the SDN-based network. The detailed effects of the present invention are as follows.

The present invention allows measurement of end-to-end QoE in the SDN network. In particular, it is possible to use the OpenFlow protocol interface, as it is, between the existing SDN controller and switch without any additional interface for managing network quality measurement conditions and measurement results in the SDN structure controlled based on OpenFlow.

In addition, the present invention provides QoE management based technology that is not dependent on an upper-level control system and a lower-level protocol. Through this, the QoE management may be applied to the existing EMS, QoE measurement dedicated server, and the like including the SDN controller. Also, the present invention provides the quality measurement and QoE management based technology which is generally applicable to the SDN switch, the base station, the base station controller, the core equipment, IP equipment such as the switch or the router constituting the network, and the like.

The present invention simply extends the OpenFlow protocol interface between the existing SDN controller and switch to accommodate a common platform for the existing QoE management. By applying this method, it is possible to easily implement the SDN application service that provides QoE management in the SDN structure, and also to provide various new additional services based on the optimized path control function to which QoE is applied.

In addition, the extension of OpenFlow in the present invention may create various possibilities applicable to the SDN structure. In other words, by utilizing the structure proposed in the present invention in addition to the operation such as flow-based path control defined in the conventional OpenFlow standard, various applications for the SDN controller are possible through communication between blocks in the SDN switch through the OpenFlow message.

Also, it is possible to measure and manage the QoE of network nodes by the SDN controller, and to link the functions to the existing network equipment without installing any additional apparatus. It enables a network operator to easily manage all network nodes in a single SDN environment without having a burden of CAPEX and OPEX.

While the present invention has been particularly shown and described with reference to exemplary embodiments thereof, it is clearly understood that the same is by way of illustration and example only and is not to be taken in conjunction with the present invention. It will be understood by those skilled in the art that various changes in form and details may be made therein without departing from the subject matter and scope of the present invention.

The invention claimed is:

1. A method for measuring a quality of experience (QoE) on a communication path between a software defined networking (SDN) switch and a quality measurement protocol receiver in the SDN switch, the method comprising:
   receiving, from a SDN controller, a quality measurement request message including type information of a service;
   generating a standard probe packet based on the type information of a service using a user traffic emulation function;
   measuring the QoE of the communication path using the standard probe packet; and
   transmitting, to the SDN controller, a QoE test reply message including quality related information based on the measurement of the communication path,
   wherein the quality measurement request message and the QoE test reply message are transmitted as being included in an OpenFlow message.

2. The method of claim 1, wherein the quality related information includes at least one of a QoE metric, information about a packet transmission delay time, event information when measuring the quality, and period information.

3. The method of claim 2, wherein the QoE metric is created by extracting common information from quality measurement results for at least one protocol for the quality measurement.

4. The method of claim 1, wherein the probe packet is one of packets corresponding to voice over long term evolution (VoLTE), Wideband audio, voice over Internet protocol, VoIP, and Video traffic.

5. A software defined networking (SDN) switch for measuring a quality of experience (QoE) on a communication path between the SDN switch and a quality measurement protocol receiver, the SDN switch comprising:
an interface configured to transmit and receive a message to and from other apparatus; and
a controller configured to:
receive, from a SDN controller, a quality measurement request message including type information of a service,
generate a standard probe packet based on the type information of a service using a user traffic emulation function,
measure the QoE of the communication path using the standard probe packet, and
transmit, to the SDN controller, a QoE test reply message including quality related information based on the measurement of the communication path, wherein the quality measurement request message and the QoE test reply message are transmitted as being included in an OpenFlow message.

6. The SDN switch of claim 5, wherein the quality related information includes at least one of a QoE metric, information about a packet transmission delay time, event information when measuring the quality, and period information.

7. The SDN switch of claim 5, wherein the QoE metric is created by extracting common information from quality measurement results for at least one protocol for the quality measurement.

8. The SDN switch of claim 5, wherein the probe packet is one of packets corresponding to voice over long term evolution (VoLTE) Wideband audio, voice over Internet protocol, VoIP, and Video traffic.

9. A method for controlling a quality of experience (QoE) measurement on a communication path between a software defined networking (SDN) switch and a quality measurement protocol receiver in a SDN controller, the method comprising:
receiving, from a user, a QoE measurement condition including type information of a service;
transmitting, to the SDN switch, a quality measurement request message based on the QoE measurement condition;
receiving, from the SDN switch, a QoE test reply message including quality related information; and
providing, to the user, quality related information based on the QoE test reply message,
wherein the quality measurement request message and the QoE test reply message are transmitted as being included in an OpenFlow message.

10. The method of claim 9, wherein the QoE measurement condition further includes codec information of the service.

11. The method of claim 9, wherein the quality measurement request message includes setting an indicator for indicating the quality measurement request message of a protocol to be measured in the OpenFlow message, an indicator for indicating a start of the quality measurement, and an indicator for indicating the received quality measurement condition.

12. A software defined networking (SDN) controller for controlling a quality of experience (QoE) measurement on a communication path between a SDN switch and a quality measurement protocol receiver, the SDN controller comprising:
a QoE application included in the SDN controller configured to receive a QoE measurement condition from a user and provide quality related information to the user;
a control protocol layer configured to:
transmit, to the SDN switch, a quality measurement request message based on the QoE measurement condition, and
receive, from the SDN switch, a QoE test reply message including quality related information; and
a control module layer configured to provide an interface between the QoE application and the control protocol layer,
wherein the quality measurement request message and the QoE test reply message are an OpenFlow message.

13. The SDN controller of claim 12, wherein the QoE measurement condition further includes codec information of a service.

14. The SDN controller of claim 12, wherein the control protocol layer is further configured to set an indicator for indicating the quality measurement request message of a protocol to be measured in the OpenFlow message, an indicator for indicating a start of the quality measurement, and an indicator for indicating the received quality measurement condition.

* * * * *